United States Patent
Kramer et al.

(10) Patent No.: US 11,023,855 B1
(45) Date of Patent: Jun. 1, 2021

(54) MANAGING ELECTRONIC REQUESTS ASSOCIATED WITH ITEMS STORED BY AUTOMATIC REPLENISHMENT DEVICES

(71) Applicant: Amazon Technologies, Inc., Seattle, WA (US)

(72) Inventors: Allison Kramer, Seattle, WA (US); Kevin Chu, Seattle, WA (US); Samuel Stevens Heyworth, Seattle, WA (US); Devon Merritt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 248 days.

(21) Appl. No.: 15/927,324

(22) Filed: Mar. 21, 2018

(51) Int. Cl.
*G06Q 10/08* (2012.01)
*G06Q 30/06* (2012.01)

(52) U.S. Cl.
CPC ..... *G06Q 10/0875* (2013.01); *G06Q 10/0838* (2013.01); *G06Q 30/0635* (2013.01)

(58) Field of Classification Search
CPC ..... G06Q 10/087; G06Q 20/208; G06Q 10/08
See application file for complete search history.

(56) References Cited

U.S. PATENT DOCUMENTS

| | | | |
|---|---|---|---|
| 5,168,445 A | 12/1992 | Kawashima et al. | |
| 5,235,509 A * | 8/1993 | Mueller | G06Q 10/087 345/173 |
| 6,204,763 B1 | 3/2001 | Sone | |
| 6,799,085 B1 | 9/2004 | Crisp, III | |
| 7,542,866 B1 | 6/2009 | Lovegren et al. | |
| 8,005,761 B1 | 8/2011 | Braumoeller et al. | |
| 8,260,672 B2 | 9/2012 | Weel et al. | |
| 8,718,620 B2 | 5/2014 | Rosenblatt | |
| 9,267,834 B2 | 2/2016 | Chowdhary et al. | |

(Continued)

FOREIGN PATENT DOCUMENTS

| WO | 2016149674 | 9/2016 |
|---|---|---|
| WO | 2017118845 | 7/2017 |

OTHER PUBLICATIONS

U.S. Appl. No. 15/918,205, U.S. Patent Application, titled "Managing Shipments Based on Data From a Sensor-Based Automatic Replenishment Device," filed Mar. 12, 2018.

(Continued)

*Primary Examiner* — A. Hunter Wilder
(74) *Attorney, Agent, or Firm* — Kilpatrick Townsend & Stockton LLP

(57) ABSTRACT

Techniques for generating an electronic request based on sensor data of an ARD are described. In an example, a computer system receives a message from the ARD The message includes the sensor data and an identifier of the ARD. The computer system identifies the item from a profile associated with the ARD based on the identifier, and determines an amount of the item stored by the ARD based on the sensor data. Further, the computer system generates the electronic request for a replacement amount of the item based on the amount of the item, on a rule, and on a constraint. The electronic request identifies the item and the ARD. The rule specifies a customization of the electronic request based on the item. The constraint specifies a limit on the customization based on the identifier. The computer system causes a delivery of the replacement amount based on the electronic request.

20 Claims, 10 Drawing Sheets

(56) References Cited

U.S. PATENT DOCUMENTS

| | | | |
|---|---|---|---|
| 9,619,831 | B1 | 4/2017 | Kumar et al. |
| 10,360,617 | B2 | 7/2019 | High et al. |
| 10,438,276 | B2 | 10/2019 | Godsey et al. |
| 10,445,672 | B2 | 10/2019 | Renfroe |
| 10,445,819 | B2 | 10/2019 | Renfroe |
| 10,474,987 | B2 | 11/2019 | Corona et al. |
| 2006/0206373 | A1 | 9/2006 | Blair et al. |
| 2007/0162326 | A1 | 7/2007 | Weel et al. |
| 2008/0113614 | A1 | 5/2008 | Rosenblatt |
| 2010/0076903 | A1 | 3/2010 | Klingenberg et al. |
| 2011/0153466 | A1 | 6/2011 | Harish et al. |
| 2012/0038456 | A1 | 2/2012 | Pikkarainen et al. |
| 2013/0038455 | A1 | 2/2013 | Chowdhary et al. |
| 2013/0231877 | A1 | 9/2013 | Weber et al. |
| 2013/0300595 | A1 | 11/2013 | Hemmendorff |
| 2014/0095479 | A1 | 4/2014 | Chang et al. |
| 2014/0203040 | A1 | 7/2014 | Clark et al. |
| 2015/0142621 | A1 | 5/2015 | Gray et al. |
| 2015/0178654 | A1 | 6/2015 | Glasgow et al. |
| 2015/0186836 | A1 | 7/2015 | Chouhan et al. |
| 2015/0278912 | A1 | 10/2015 | Melcher et al. |
| 2015/0302510 | A1 | 10/2015 | Godsey et al. |
| 2015/0329260 | A1 | 11/2015 | Singh |
| 2016/0019780 | A1* | 1/2016 | Gettings ............... G08C 17/02 340/12.5 |
| 2016/0040580 | A1 | 2/2016 | Khaled et al. |
| 2016/0132821 | A1* | 5/2016 | Glasgow ............. G06Q 10/087 705/28 |
| 2016/0134930 | A1 | 5/2016 | Swafford |
| 2016/0180239 | A1 | 6/2016 | Frankel et al. |
| 2016/0203431 | A1 | 7/2016 | Renfroe |
| 2016/0229678 | A1 | 8/2016 | Difatta et al. |
| 2016/0314514 | A1 | 10/2016 | High et al. |
| 2016/0347540 | A1 | 12/2016 | Skocypec et al. |
| 2017/0201057 | A1 | 7/2017 | Ahlawat et al. |
| 2017/0300984 | A1 | 10/2017 | Hurwich |
| 2018/0053140 | A1 | 2/2018 | Baca et al. |
| 2018/0164143 | A1 | 6/2018 | Gurumohan et al. |
| 2018/0165627 | A1 | 6/2018 | Jones et al. |
| 2018/0260779 | A1 | 9/2018 | Singh et al. |
| 2018/0308514 | A1 | 10/2018 | Li et al. |
| 2019/0108483 | A1* | 4/2019 | Tineo ................. G06Q 10/0875 |
| 2020/0105409 | A1 | 4/2020 | Kochar et al. |

OTHER PUBLICATIONS

U.S. Appl. No. 15/926,779, U.S. Patent Application, titled "Product Specific Correction for a Sensor-Based Device," filed Mar. 20, 2018.

U.S. Appl. No. 15/927,946, U.S. Patent Application, titled "Automatic Replenishment of Items Utilizing a Sensor-Based Device," filed Mar. 21, 2018.

U.S. Appl. No. 15/927,990, U.S. Patent Application, titled "Order Quantity and Product Recommendations Based on Sensor Data," filed Mar. 21, 2018.

U.S. Appl. No. 15/927,998, U.S. Patent Application, titled "Predictive Consolidation System Based on Sensor Data," filed Mar. 21, 2018.

U.S. Appl. No. 15/928,370, U.S. Patent Application, titled "Product and Lid Identification for Sensor-Based Device," filed Mar. 22, 2018.

U.S. Appl. No. 15/928,409, U.S. Patent Application, titled "Led Enhanced Product and Lid Identification for Sensor-Based Device," filed Mar. 22, 2018.

U.S. Appl. No. 15/934,780, U.S. Patent Application, titled "Test-Enabled Measurements for a Sensor-Based Device," filed Mar. 23, 2018.

U.S. Appl. No. 15/963,761, U.S. Patent Application, titled "Sensor-Related Improvements to Automatic Replenishment Devices," filed Apr. 26, 2018.

Griffiths, "Never Run Out of Food Again! Smart Mat Warns You When You're Low on Milk While Fridge Cam Lets you Remotely Check What you Already Have During your Weekly Shop," Available online at http://www.dailymail.co.uk/sciencetech/article-3385278/Never-run-food-Smart-mat-tells-low-milk-fridge-cam-shows-s-inside-shopping.html, Jan. 5, 2016, 8 pages.

PCT/US2019/022215 , "International Search Report and Written Opinion", dated Apr. 29, 2019, 11 pages.

U.S. Appl. No. 15/696,040, U.S. Patent Application, titled "Sensor Data-Based Reordering of Items," filed Sep. 5, 2017.

"Amazon Dash Replenishment", XP054979477, Available online at URL:https://www.youtube.com/watch?v=vTYcWG 6BIDY, Jan. 19, 2016, 3 pages.

"Amazon Dash Replenishment for Developers", XP054979476, Available online at URL:https://www.youtube.com/watch?v=WS42WcuSyVU, Jan. 30, 2017, 5 pages.

"Dash Replenishment Service CX Guidelines", Dash Replenishment Service, XP055598411, Available online at URL:https://web.archive.org/web/20171208012109/https://developer.amazon.com/docs/das h/customer-experience-guidelines.html, Dec. 8, 2017, 9 pages.

"Dash Replenishment Service Glossary", Dash Replenishment Service, XP055598456, Available online at: URL:https://web.archive.org/web/20171208041422/https://developer.amazon.com/docs/das h/glossary.html, Dec. 8, 2017, 6 pages.

"Frequently Asked Questions", Dash Replenishment Service, XP055598417, Available online at URL:https://web.archive.org/web/2017120801 2934/https://developer.amazon.com/docs/das h/faqs.html, Dec. 8, 2017, 5 pages.

"GetOrderinfo Endpoint", Dash Replenishment Service, XP055598458, Available online at URL:https://web.archive.org/web/2017120804 1609/https://developer.amazon.com/docs/das h/getorderinfo-endpoint.html, Dec. 8, 2017, 6 pages.

"Notification Messages (DRS)", Dash Replenishment Service, XP055598457, Available online at URL:https://web.archive.org/web/2017120804 1525/https://developer.amazon.Gom/docs/das h/notification-messages.html, Dec. 8, 2017, 14 pages.

"SlotStatus Endpoint", Dash Replenishment Service, XP055598461, Available online atURL:https://web.archive.org/web/20171208041548/https://developer.amazon.com/docs/das h/slotstatus-endpoint.html, Dec. 8, 2017, 7 pages.

"Amazon Dash Replacement for Developers", Youtube, Available Online at: https://www.youtube.com/watch?v=WS42WcuSyVU, Jan. 30, 2017, 4 pages.

Li et al., "Discussion of Principle and Application for Internet of Things", Applied Mechanics and Materials, vol. 347-350, 2013, pp. 3322-3325.

Welch et al., "Seven Keys to ERP Success", Strategic Finance, vol. 89, No. 3, Institute of Management Accountants, Sep. 2007, pp. 41-61.

* cited by examiner

MANAGING ELECTRONIC REQUESTS ASSOCIATED WITH ITEMS STORED BY AUTOMATIC REPLENISHMENT DEVICES

BACKGROUND

Automatic replenishment devices (ARDs) allow a user to receive updates about an item by associating the device with the item and identifying a user device (e.g., a mobile phone number). Over time, the ARD sends alerts to the user device about measurements related to the item. If deemed that the item should be replenished, the user may operate the user device, access an online retailer, and order an additional amount of the item. Additionally, the online retailer may offer a subscription service that can deliver additional amounts on a periodic basis.

However, the integration between measurements generated by the ARD and the back-end system is typically limited. For example, item ordering is not automated based on the ARD measurements. Instead, the back-end system generally processes an order for an item originating from a user device or origination based on a subscription schedule.

BRIEF DESCRIPTION OF THE DRAWINGS

Various embodiments in accordance with the present disclosure will be described with reference to the drawings, in which.

DETAILED DESCRIPTION

Figure 1:
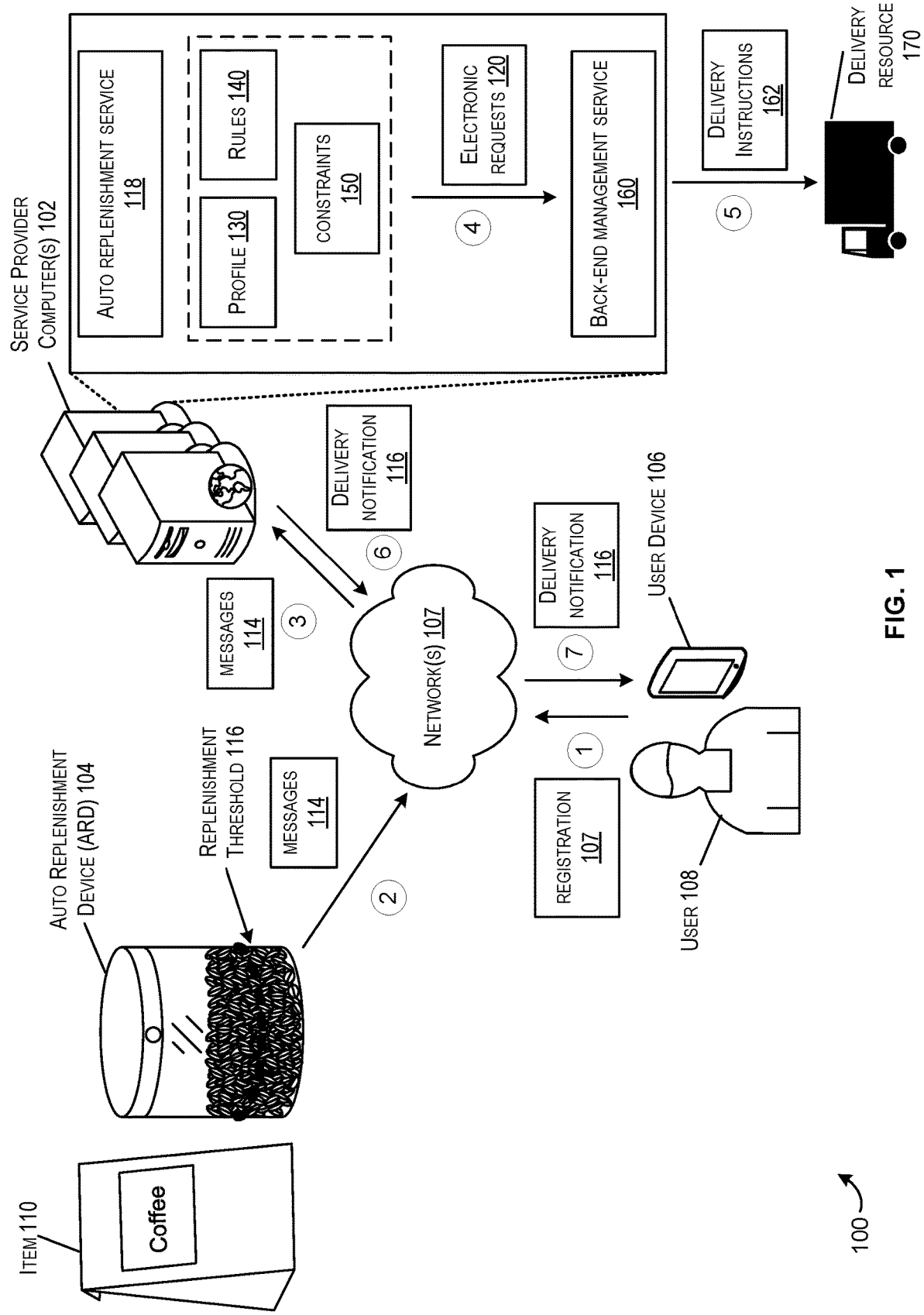
FIG. 1 illustrates a workflow for selecting a delivery method based on sensor data of an automatic replenishment device (ARD), in accordance with at least one embodiment.

Embodiments of the present disclosure are directed to, among other things, improving the integration between automatic replenishment devices (ARDs) and a back-end system of an online retailer. In an example, a device profile may be maintained on a computer system of the back-end system for an ARD associated with a user. The device profile may identify the ARD, the item that is stored by the ARD, a user account associated with the user, and a delivery location associated with the ARD and/or the user, among other information. Over time, the computer system may receive, from the ARD, messages. Each message may include sensor data generated by a sensor of the ARD and indicating an amount of the item remaining at the ARD. Each message may also include an identifier of the ARD (e.g., an ARD ID). The messages may further include a hash for authentication and may be secured with encryption. Upon authentication and decryption, the computer system may generate a timestamp indicating the time at which the message was received and may store the related sensor data along with the timestamp in the device profile based on the ARD ID. The computer system may determine the current amount of the item stored by the ARD from the stored sensor data given the different timestamps. If this amount is low, a replacement amount should be delivered to the delivery location. Accordingly, the computer system may generate an electronic request for the replacement amount. This request may identify the ARD (e.g., may include the ARD ID), the item (e.g., an item ID along with the replacement amount), the delivery location, information from the user account, among other information. Further, the computer system may look-up a rule applicable to the item (e.g., based on the item ID) to identify whether the order should be customized. If customization is applicable, the computer system may also look up a constraint on the customization based on the ARD ID. Based on the rule and the constraint, the computer system may customize the order (e.g., change the item, the size of the item, the replacement amount, information applicable to the user account, etc.). Upon customization, the order may be further processed to obtain the replacement amount from a storage facility and allocate delivery resources to deliver the item to the delivery location.

To illustrate, consider an example of a smart container storing coffee beans as an ARD. Sensor data indicating a fill level of the coffee beans may be received at time intervals along with an identifier of the smart container, such as a device serial number (DSN). That data may be time stamped and stored in a device profile of the smart container based on the DSN. The computer system may generate consumption data from the sensor data over time and may determine that, at a particular point in time, the fill level is less than ten percent of the original full level (or some other threshold amount). Accordingly, the computer system may determine that the current amount of coffee beans is low and should be replenished based on a replenishment process. Under this process, the specific coffee beans brand and replacement amount may be determined from the device profile, in addition to the delivery location and the user account. Based on the coffee beans brand and/or the replacement amount, a promotional rule may be looked up to determine whether a promotion is applicable. If so, a promotional constraint may be looked up to determine whether any constraint exists on the applying the promotion to the replacement amount given a history from the device profile about past promotions applied for the smart container. The computer system may generate an electronic request for the replacement amount customized according to the promotion and the constraint as applicable. The electronic request may be then processed to cause a delivery of the replacement amount to the delivery location and to update the user account.

Many technological improvements over existing systems are possible. In an example, better integration between the ARD and the back-end system may be achieved. In particular, much of the processing may be offloaded from the ARD to the computer system of the back-end system. It may be sufficient for the ARD to send its raw sensor data and an identifier of the ARD. The processing of this data, computation of a consumption rate, and maintenance of a device profile may be performed by the computer system. This may translate into processing savings on the ARD, thereby allowing the ARD to lower its power consumption.

Furthermore, the processing of the sensor data and maintenance of the device profile may allow additional optimization of services available from the back-end system. In particular, by monitoring the sensor data over time and by associating that data with the device profile, monitoring the consumption of the item stored by the ARD may become possible. The supporting data for this monitoring (e.g., the sensor data, the timestamps, the ARD ID, etc.) may represent new data not available in existing systems that involve ARDs. This new data may be used to automate and optimize the decision on when to electronically request replacement amounts. Further, this new data may be used to identify rules and constraints applicable to the item and the ARD to customize the electronic requests. In the existing systems, in the case of a user-based purchase, the user may request a replacement amount. Or, in the case of a subscription service, the existing systems may use a schedule to request a replacement amount. However, these systems do not automate the electronic requests nor do they optimize them to the device profile of the ARD. In contrast, the new data may be used to select the optimal time for requesting the replacement amount and may customize the electronic requests based on the device profile.

In addition, the automation may be further improved by using a particular structure of the messages sent by the ARD. Specifically, these messages may be secured with encryption and may include a hash for authentication. When a message is decrypted and authenticated, the sensor data and ARD ID from the message may be processed, thereby avoiding potential hacking and spoofing.

FIG. 1 illustrates a workflow 100 for selecting a delivery method based on sensor data of an automatic replenishment device (ARD), in accordance with at least one embodiment. In the illustrated example, a service provider computer(s) 102, an ARD 104, and a user device 106 may be configured to communicate with one another via data network(s) 105 (e.g., a local area network, a wide area network, a cellular network, the Internet, or the like) via any suitable communications protocol. The service provider computer(s) 102 may receive messages 114 related to an item(s) 110 from the ARD 104 and may generate electronic requests 120 for replacement amounts of the item(s) 110 to be delivered to a delivery location associated with the ARD 104 or with a user 108 of the ARD 104. The electronic requests 120 may be processed to obtain the replacement amounts and schedule their deliveries. A delivery resource 170, such as a delivery vehicle, may deliver a replacement amount to the delivery location.

Prior to performance of the workflow 100, the user 108 may utilize any suitable means for obtaining the item(s) 110 (e.g., coffee beans). For example, the user 108 may utilize the user device 106 to browse an electronic marketplace for coffee beans. The electronic marketplace may be hosted by the service provider computer(s) 102 and/or another suitable system (which may be generally referred to herein as a back-end system). Utilizing interfaces provided by the electronic marketplace, the user 108 may purchase the coffee beans which may then be delivered to the delivery location. It should be appreciated that the item(s) 110 may be obtained using other means (e.g., purchased from a retail store, received as a gift, etc.).

Once obtained, the item(s) 110 may be placed on/in the ARD 104. In some embodiments, the ARD 104 may include a container and a lid as depicted in FIG. 1. The lid may include one or more time-of-flight (ToF) sensors. Once placed within the ARD 104 as depicted in FIG. 1, the item(s) 110 may fill the ARD 104 to some level (e.g., an actual fill level).

At step 1 of the workflow 100, the user 108 may utilize the user device 106 to perform a process for associating the item(s) 110 with the ARD 104. For example, the user device 106 may be utilized to access an application and/or website (e.g., hosted by the service provider computer(s) 102) to perform an association process. During the association process, the user device 106 (e.g., via the application and/or website) may be utilized to provide account information such as a name, a shipping address, billing information (e.g., payment method), or the like that the service provider computer(s) 102 may store in a user account. Alternatively, the user device 106 may be utilized to sign in to the user account maintained by the service provider computer(s) 102 in order to access previously stored account information. During the association process, the user device 106 may be utilized to associate the item(s) 110 with the ARD 104. As a non-limiting example, an identifier (e.g., a serial number, bar code, or other suitable identifier) of the ARD 104 may be entered, scanned, and/or selected at the user device 106. An item identifier may also be entered, scanned, and/or selected at the user device 106. The user device 106 may then be utilized to provide an indication that the item identifier of the item(s) 110 is to be associated with the identifier of the ARD 104. The service provider computer(s) 102 may generate a profile 130 associated with the ARD 104 (or, similarly with the user 108). The profile 130 may store the identifier of the ARD 104, the identifier of the item(s) 110 and information describing that the item(s) 110 is associated with the ARD 104. In addition, the profile 130 may identify the user account (e.g., may be linked to the user account, such as by including a network address of a network storage location storing the user account). Additionally or alternatively, the profile 130 may include some information from the user account, such as the shipping address (as a delivery location) and billing information (e.g., payment information).

Furthermore, the association process may include a registration 107 of the ARD 104 with the service provider computer(s) 102, beyond the generation of a profile 130. The registration 107 may include the exchange of a registration identifier (registration ID) between the ARD 104 and the service provider computer(s) 102. This registration ID may be a shared secret that the ARD 104 may use to generate a hash for each message 114 sent to the service provider computer(s) 102 and that the service provider computer(s) 102 may use to authenticate the messages 114 based on the hash. That registration ID may be stored in local memory of the ARD 104 and in the profile 130 maintained by the service provider computer(s) 102 or in some other storage location accessible to the service provider computer(s) 102.

At step 2 of the workflow 100, messages generated by the ARD 104 may be transmitted by the ARD 104 to the service provider computer(s) 102 over the data network(s) 105. Each of the messages 114 may include sensor data generated by one or more sensors of the ARD 104, the identifier of the ARD 104, and a hash generated based on the registration ID, as further illustrated in FIG. 2. The sensor data may be collected and/or at any suitable time according to a predetermined schedule, at periodic time intervals, upon sensing user interaction with the item(s) 110 and/or the ARD 104, upon user input entered at the ARD 104, upon instruction from the service provider computer(s) 102 and/or the user device 106, or at any suitable time. The sensor data may indicate property of the item (e.g., a distance measurement that corresponds to the measure fill level based on sensed time of flight data by an optical sensor of the ARD 104, a weight based on a weight sensor of the ARD 104, and/or other sensed data that may indicate the amount of the item 110 stored by the ARD 104).

At step 3, the service provider computer(s) 102 may receive the messages 114. The messages 114 may include the identifier of the ARD 104 and raw data that indicates the amount of item(s) 110 stored by the ARD 104 (e.g., the measured distance between the sensor and the item(s) 110 and a signal return rate (SRR) indicating some amount of light returned to the sensor given a particular light emission, weight data, etc.). The service provider computer(s) 102 may host an automatic replenishment service 118. The automatic replenishment service 118 may decrypt each received message (if encrypted) and authenticate the decrypted message based on the hash. Thereafter, the automatic replenishment service 118 may identify the ARD 104 from the identifier included in a processed message, may timestamp the sensor data from this message in the profile 130 based on the identifier of the ARD 104.

At step 4, the automatic replenishment service 118 may translate sensor data stored in the profile 130 into consumption data over time based on the timestamps. For example, the automatic replenishment service 118 may compute, each time the sensor data is received at a time interval, the amount of the item 110 stored by the ARD 104. A curve of this amount over time may be generated and may represent a consumption rate curve. The slope of the curve may indicate a speed at which the item may be consumed. A change in the slope (e.g., an increase) may indicate a change to (e.g., an increase in) the consumption. Based on the consumption rate curve, the automatic replenishment service 118 may estimate the amount of the item 110 at a current time and may determine that this current amount may be below a replenishment threshold 116 (e.g., the fill level may be less than ten percent of the total storage capacity of the ARD 104, the weight of the amount of the item 110 is less than ten percent of the original weight stored by the ARD 104, etc.). Accordingly, the automatic replenishment service 118 may determine that it is time to request a replacement amount to be sent to the delivery location.

The automatic replenishment service 118 may generate an electronic request 120 for the replacement amount. This electronic request 120 may identify the ARD 104 (e.g., include the identifier of the ARD 104 from the profile 130), the item(s) 110 (e.g., include the identifier of the item(s) 110 from the profile 130, the identifier in turn may identify the replacement amount), the delivery location (e.g., the shipping address from the profile 130 or from the user account), and billing information (e.g., the payment information from the profile 130 or the user account), among other information. In a way, the electronic request 120 may represent a purchase order that may be further processed to obtain and ship the replacement amount from a storage facility.

In addition, the electronic request 120 may be customized based on the identifier(s) of the item 110 and the identifier of the ARD 104. In particular, the service provider computer(s) 102 may store in a database(s) rules 140 and constraints 150, separately from a storage location that stores the profile 130. The rules 140 may specify a customization to electronic requests associated with the item(s) 110. For example, the rules 140 may specify a promotion (e.g., discounts) applicable to the item(s) 110, a recommendation for substitute items (e.g., different colors, flavors, similar items (e.g., a different brand of coffee beans), etc.), a shipment of a special container storing the replacement amount for ease of installation in the ARD 104, etc. The constraints 150 may specify limits on the customizations of the electronic requests based on the identifier of the ARD 104. For example, a history of past customizations may be stored in the profile 130. That history may show that a promotion has already been used a number of times. Hence, if a rule identifies the promotion, the constraint may limit its applicability (e.g., modify the promotion, such as updating a discount from a first value to a second value). Accordingly, the automatic replenishment service 118 may customize the electronic request 120 by looking-up the applicable set of the rules 140 and the applicable set of the constraints 150 and applying these two sets to the electronic request 120. For example, for a promotional discount, the payment information in the electronic request 120 may show the discounted price of the replacement amount. For a substitute recommendation, the electronic request 120 may be updated to replace the identifier of the item(s) with an identifier of the substitute item(s).

The automatic replenishment service 118 may send the electronic request 120 to a back-end management service 160. This service 160 may manage obtaining the replacement amount from the storage facility and its delivery to the deliver location. At step 5, the back-end management service 160 may generate acquisition and delivery instructions from the electronic request 120. These instructions may identify the item, the storage location in the storage facility, a delivery method, and a delivery timeframe. The back-end management service 160 may accordingly allocate delivery resources (e.g., robotic manipulators to retrieve and pack the replacement amount from the storage location and delivery vehicles for shipping the packed replacement amount).

Although the automatic replenishment service 118 is illustrated as customizing the electronic request 120, the back-end management service 160 may perform this customization instead. In particular, an un-customized electronic request 120 may be generated by the auto replenishment service 118 and sent to the back-end management service 160. This electronic request 120 may identify the ARD 104, the item(s) 110, the delivery location, and the billing information, but may not be subject to the rules 140 and constraints 150. Instead, the back-end management service 160 may access the rules 140 and constraints 150 from the database(s) and the profile 130 from the storage location and, accordingly, may customize the received electronic request 120. The back-end management service 160 may send an indication of the customization to the automatic replenishment service 118 such that this service 118 can update the profile 130 with information about the customization (e.g., by updating the customization history of the AD 104). Alternatively, the back-end management service 160 may directly update the profile 130 with this information.

At step 6, the service provider computer(s) 102 may send a delivery notification 116 to the user device via the network(s) 105. For example, the service provider computer(s) 102 may inform the user 108 of an initiation of the delivery, may identify the ARD 104, and may explain that the replacement amount was placed on behalf of the ARD 104 given the current amount of the item. The delivery notification 116 may also provide an option to the user to accept and/or cancel the delivery.

At step 7, the user device 106 may receive and present the delivery notification 116. In an example, the user 108 may operate the user device 106 to access the user account and/or the profile 130. The user 108 can search for and browse a history of item orders. Because each of such orders may be associated with the user account (e.g., a user identifier) or with the identifier of the ARD 104, the service provider computer(s) can present the history with an option to filter between orders originated from the user device 106 (or the user 108) and orders automatically originated by the automatic replenishment service 118 for the ARD 104.

In the interest of clarity of explanation, embodiments of the present disclosure are described in connection with an ARD that is pre-associated with an item, as illustrated in FIG. 1. However, the embodiments are not limited as such. For example, the embodiments similarly apply to an ARD (or more generally a device) that may not necessarily store an item and that may not be pre-associated with the item. Instead, sensor data from this device may be used to identify the item, in addition to identifying the amount of the item, and to subsequently associate the item with the device. To illustrate, the device may include a camera or an optical sensor that may be placed over, under, or by a surface that retains an amount of the item. Image data may be generated by this device and may show the item, a portion of the item, and/or a barcode of the item. A service provider computer may receive the image data and may identify the item based on a read of the barcode or an image analysis of the shown portion of the item in the image data. At that point, the service provider computer may associate the item with the device and may further analyze this sensor data (e.g., the image data) or additional sensor data from another sensor of the device (e.g., weight data from a weight sensor) to determine the amount of the item.

Figure 2:
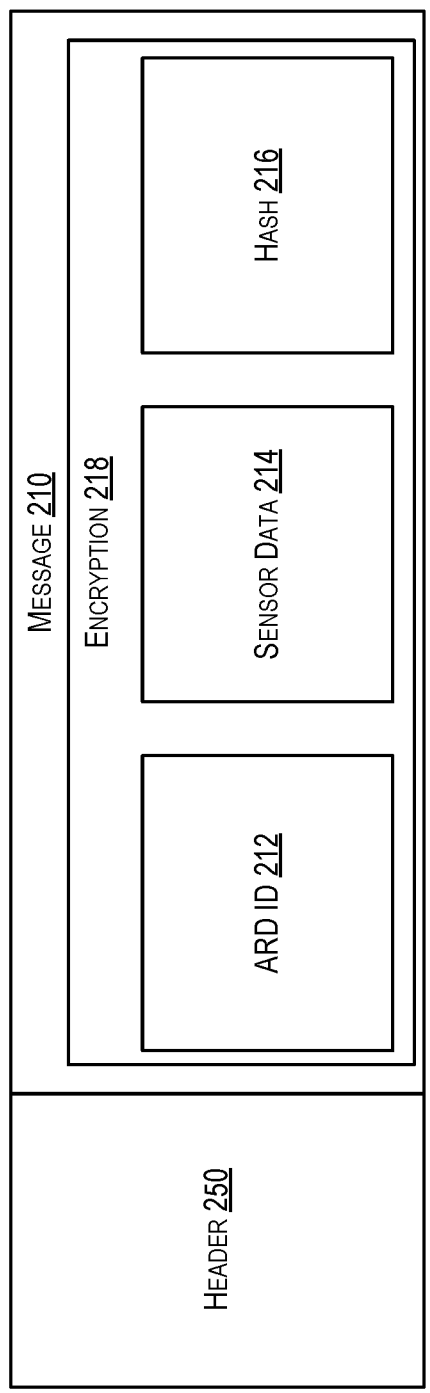
FIG. 2 illustrates a structure of a message sent from an ARD to a service provider computer, in accordance with at least one embodiment.

FIG. 2 illustrates a structure of a message 210 sent from an ARD to a service provider computer, in accordance with at least one embodiment. As illustrated, the message 210 may include an identifier of the ARD (e.g., an ARD ID 212), raw data generated by one or more sensors of the ARD (e.g., sensor data 214), and a hash 216 usable for authenticating the message 210. The message 210 may be further encrypted 218 with a key to protect its content. The encryption 218 may depend on the underlying communication protocols between the ARD and the service provider computer (e.g., IPsec, Amazon IoT Core, etc.). For Internet Protocol (IP) based communication, the message 210 may be associated with a header 250 (e.g., an IP header). This header 250 may include an IP address associated with the ARD as a source address and an IP address associated with the service provider computer as a destination address.

In an example, the ARD ID 212 may be a device serial number that may be unique to the ARD. That device serial number may be stored in a profile associated with the ARD during an initial association process, as described in connection with FIG. 1. The sensor data 214 may include the raw data generated by the sensor(s), such as weight data, distance measurement data, ToF data, volume data, and the like. The hash 216 may be hash of the ARD ID 212 and/or the sensor data 214. This hash 216 may be generated by applying a hash function to ARD ID 212 and/or the sensor data 214, where the hash function may involve a device registration identifier associated with the ARD. This device registration identifier may be generated by the service provider computer and distributed to and stored by ARD during the initial association process, as described in connection with FIG. 1. The key used for the encryption 218 may be a symmetric encryption key or an asymmetric encryption key depending on the communication protocol used between the ARD and the service provider computer.

Figure 3:
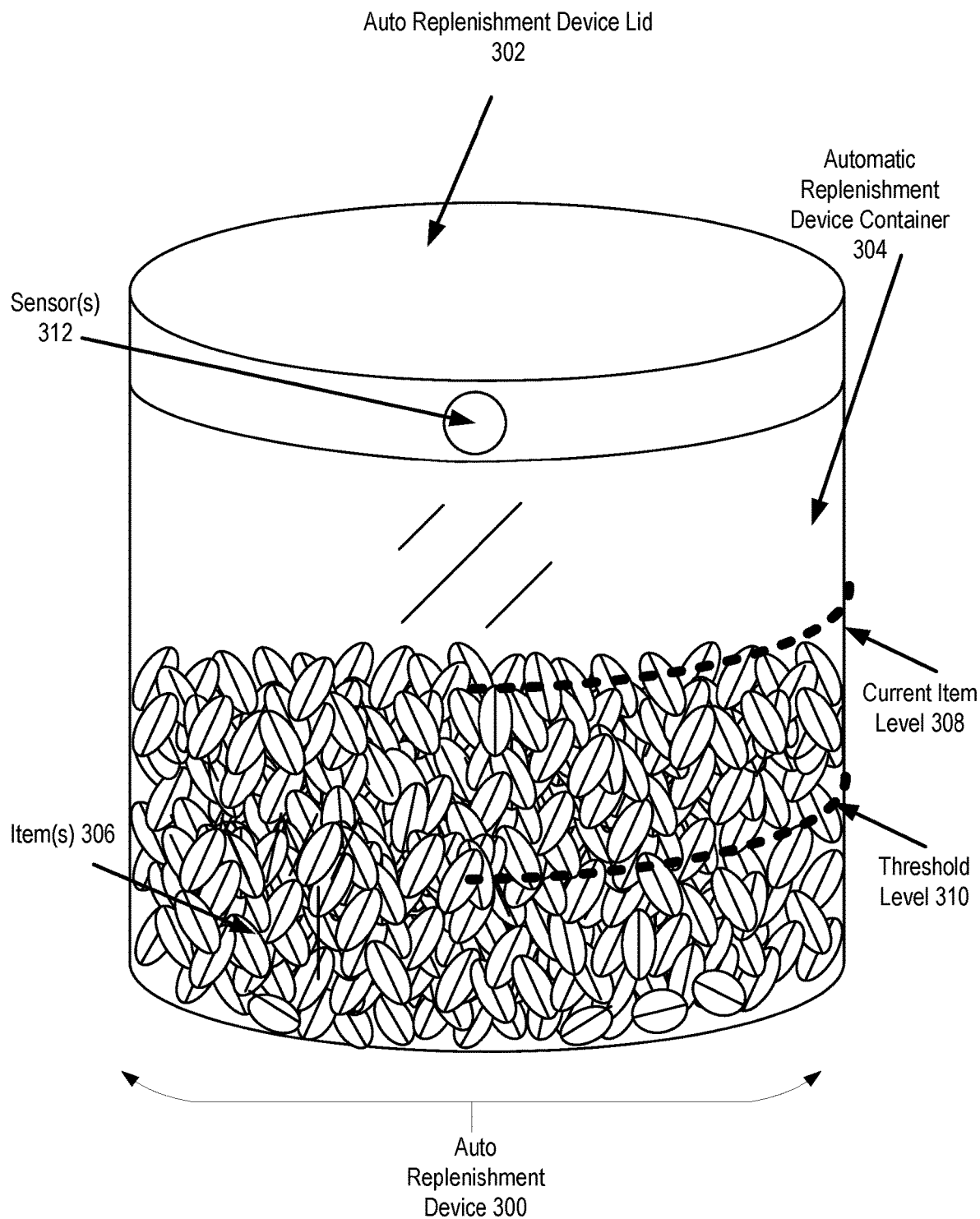
FIG. 3 illustrates an example ARD with items placed within the ARD, in accordance with at least one embodiment.

FIG. 3 illustrates an example ARD 300 with items placed within the ARD, in accordance with at least one embodiment. The ARD 300 is an example of the ARD 104 of FIG. 1 and may include an ARD lid 302, and an ARD container 304. One or more item(s) 306 (e.g., coffee beans) may be stored within the ARD container 304. FIG. 3 also includes visual representations for a current level 308 of the item(s) 306 and a threshold level 310. It should be noted that although the ARD 300 of FIG. 3 includes visual representations of a current level 308 of item and a threshold level 310, these depictions are for clarification of aspects of the embodiments described herein. For example, a current level 308 of item may be determined by service provider computer(s) 102 of FIG. 1 based on sensor data obtained by sensor(s) 312 (where the sensor data is transmitted in messages having the message structure described in connection with FIG. 2) and maintained in a profile that is generated and stored by the service provider computer(s) 102. As described herein, the current item level 308 may be determined by monitoring the consumption data that is derived from the sensor data obtained by the sensor(s) 312. The threshold level 310 may be stored and associated with the profile maintained by the service provider computer(s) 102. The threshold level 310 may be defined for the item(s) 306 based on the type or category of the items or by the user.

It should be noted that the ARD 300 of FIG. 3 represents a container which may be of any shape, depth, or size, in which item(s) 306 are placed within. In embodiments, the ARD 300 may include one or more sensor(s) 312 that may be configured to determine a distance of the item(s) 306 that are currently situated within the ARD container 304 of the ARD 300 (i.e., capture or obtain distance measurements between the one or more sensor(s) 312 and the item(s) 306). The sensor(s) 312 may include a time of flight sensor (e.g., a time of flight camera, a time of flight transmitter and receiver combination, etc.) that is configured to determine/detect a distance/amount of item(s) 306 placed in the ARD container 304 of the ARD 300 based at least in part on the time of flight for a signal to be emitted from the one or more sensor(s) 312 to a current level 308 of the item(s) 306 or to a surface area of the item(s) 306. In accordance with at least one embodiment, the sensor data collected by the one or more sensor(s) 312 may include distance measurements identifying a distance between the item(s) 306 and one or more sensor(s) 312. The sensor data may include the raw data that was obtained by the sensor(s) 312 and/or the sensor data may include values that represent a conversion from the raw data to any suitable format and/or unit of measurement.

The sensor data may indicate a current distance, amount, and/or volume of the item(s) 306 situated within the ARD container 304. For example, the sensor data may indicate a current distance (e.g., 140 mm, 5.5 inches, etc.) between the one or more sensor(s) 312 and the item(s) 306. The sensor data may indicate a current volume of the item(s) (e.g., 57.75 cubic inches, 39.23 cubic inches, etc.) and/or an item number or quantity that indicates a number or quantity of the item(s) 306 situated within the ARD container 304 of ARD 300. The ARD 300 and sensor(s) 312 may be configured to utilize any suitable time of flight signal technology between the sensor(s) 312 and the item(s) 306. In embodiments, the sensor data may be sent in a message that may include an ARD ID and, optionally, an item ID. Although the ARD 300 of FIG. 3 includes the sensor(s) 312 within or on a surface of the ARD lid 302, the sensor(s) 312 may be placed on one or more interior surfaces of the ARD container 304. In at least one embodiment, the ARD lid 302 may be configured to be placed on any suitable container (including, for instance, a container of another device such as a coffee grinder for grinding the coffee beans).

Time of flight signal technology can include any electronic signal technology that can determine the elapsed time period between a transmission of a signal from a source and a return of the signal, or at least a portion thereof, back to the source. Other configurations such as a signal source and signal detector may also be utilized to determine time of flight and distance between the sensor(s) 312 and item(s) 306 (e.g., current level of item 308) utilizing a source/detector or transmitter/receiver. In embodiments, the service provider computers may be configured to determine a distance from the sensor(s) 312 and item(s) 306 (e.g., current level of item 308) using the sensor data obtained by the sensor(s) 312.

For example, the elapsed time period between the transmission of a signal from a source to detection of the signal (e.g., from the sensor(s) 312), or at least a portion thereof, at a detector or receiver, along with the known speed of the signal (e.g., the speed of light) may be utilized to determine the distance between the source of the signal (e.g., sensor(s) 312) and the item(s) 306. The ARD 300 may be configured to transmit the sensor data obtained by sensor(s) 312 to a remote computing device separate from the ARD 300 (e.g., the service provider computer(s) 102 of FIG. 1, a cloud-based server/service, etc.). In some embodiments, the remote computing device may be configured to utilize the sensor data to calculate the distance between the sensor(s) 312 and the current level of item 308 and correlate the distance to a volume, amount, and/or quantity of the item(s) 306 left in the ARD container 304. The sensor data may be used to determine the consumption data or consumption rate of item(s) 306 and in embodiments reorder the item(s) 306 upon the amount of the item being equal to or less than the threshold level 310. The sensor data may be adjusted or corrected for any sensor drift and/or any inaccuracy of the measurements due to the type of the sensor(s) 312 (e.g., for transmissivity when the item(s) 306 may not have a particular light transmissivity property).

Figure 4:
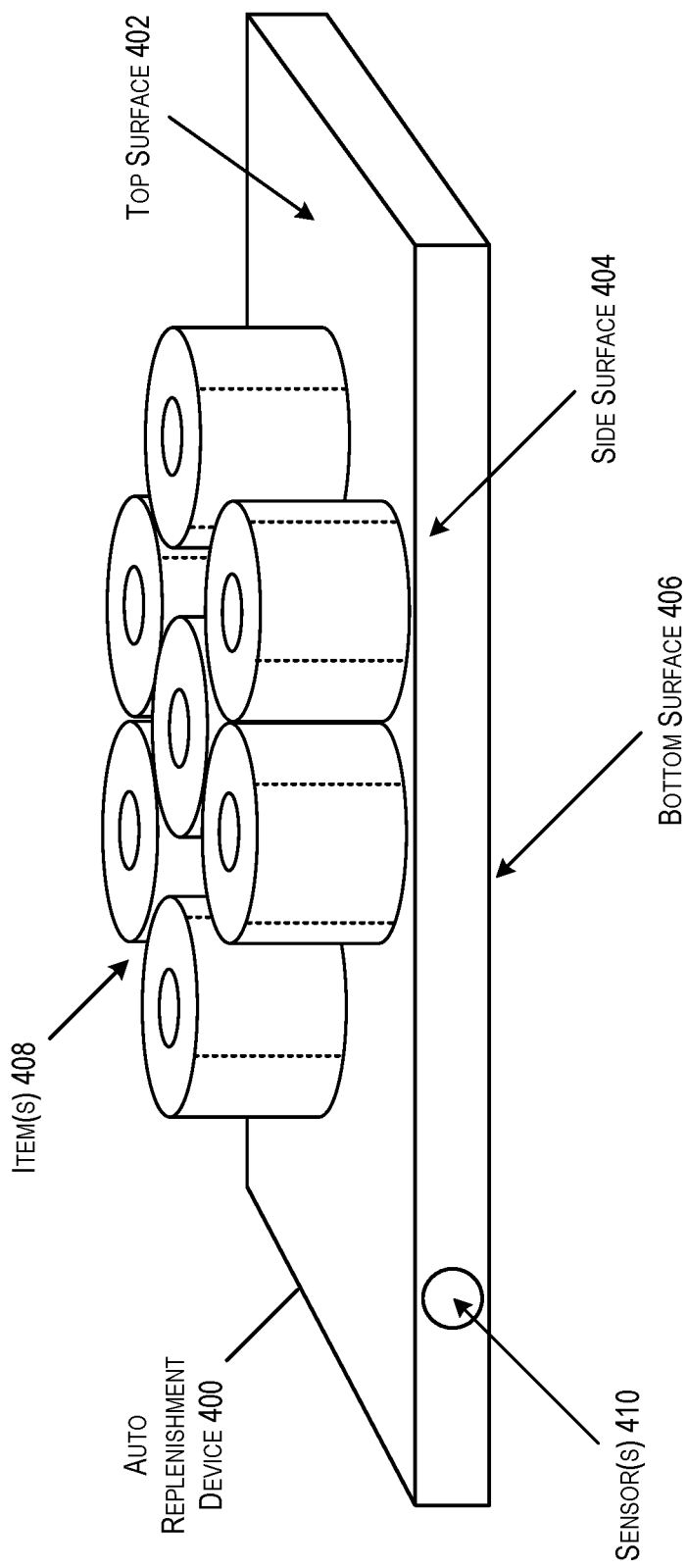
FIG. 4 illustrates an example ARD and items placed on the ARD, in accordance with at least one embodiment.

FIG. 4 illustrates an example ARD 400 and items placed on the ARD 400, in accordance with at least one embodiment. The ARD 400 may be an example of the ARD 104 from FIG. 1. As illustrated, the ARD 400 which may have a top surface 402, a side surface 404, and a bottom surface 406. One or more items 408 (e.g., toilette papers) may be placed on the top surface 402 of the ARD 400. The bottom surface 406 may be in contact with a flat or substantially flat surface, such as a counter, table, or shelf. It should be noted that although the ARD 400 of FIG. 4 represents a shelf which may be of any shape, depth, or size, the ARD 400 may be a mat or pad in which items 408 are placed thereon. In embodiments, the ARD 400 may include one or more sensor(s) 410. The sensor(s) 410 may be configured to determine a weight of the item(s) 408 that are currently placed on the top surface 402 of the ARD 400 (e.g., capture or obtain weight measurements of the items 408). The sensor(s) 410 may include a weight sensor (e.g., a load sensor, a strain gauge on a load cell, etc.) that is configured to determine/detect a weight/mass of item(s) 408 placed on the top surface 402 of the ARD 400. In accordance with at least one embodiment, the weight of the item(s) 408 (e.g., sensor data, weight measurements, or property measurements) may include the raw data that was obtained by the sensor(s) 410 and ARD 400 that represents a current weight/mass of the item(s) 408 that are situated on the top surface 402 of ARD 400. The weight measurements may indicate a current weight/mass of the item(s) 408, item volume data that indicates a current volume of the item(s) 408, and/or item number/quantity data that indicates a number or quantity of the item(s) 408 situated on the reorder device 400. In embodiments, the sensor data may be sent in a message that may also include an ARD ID and, optionally, an item OD. Further description of the ARD 400 is available in U.S. patent application Ser. No. 15/696,040 filed Sep. 5, 2017 entitled "SENSOR DATA-BASED REORDERING OF ITEMS" of which the full disclosure is incorporated herein by reference.

As described herein, the ARD 400 may be configured to transmit, via available networks, the weight measurements or other data captured by sensor(s) 410 about item(s) 408 to a service provider computer implementing an automatic replenishment service. In accordance with at least one embodiment, the weight measurements may be utilized by the service provider computers to determine consumption data of a user associated with ARD 400 of the items 408. The consumption data may be utilized to determine that a replacement amount of the items 208 (e.g., additional rolls of the toilette paper) should be requested and delivered.

Figure 5:
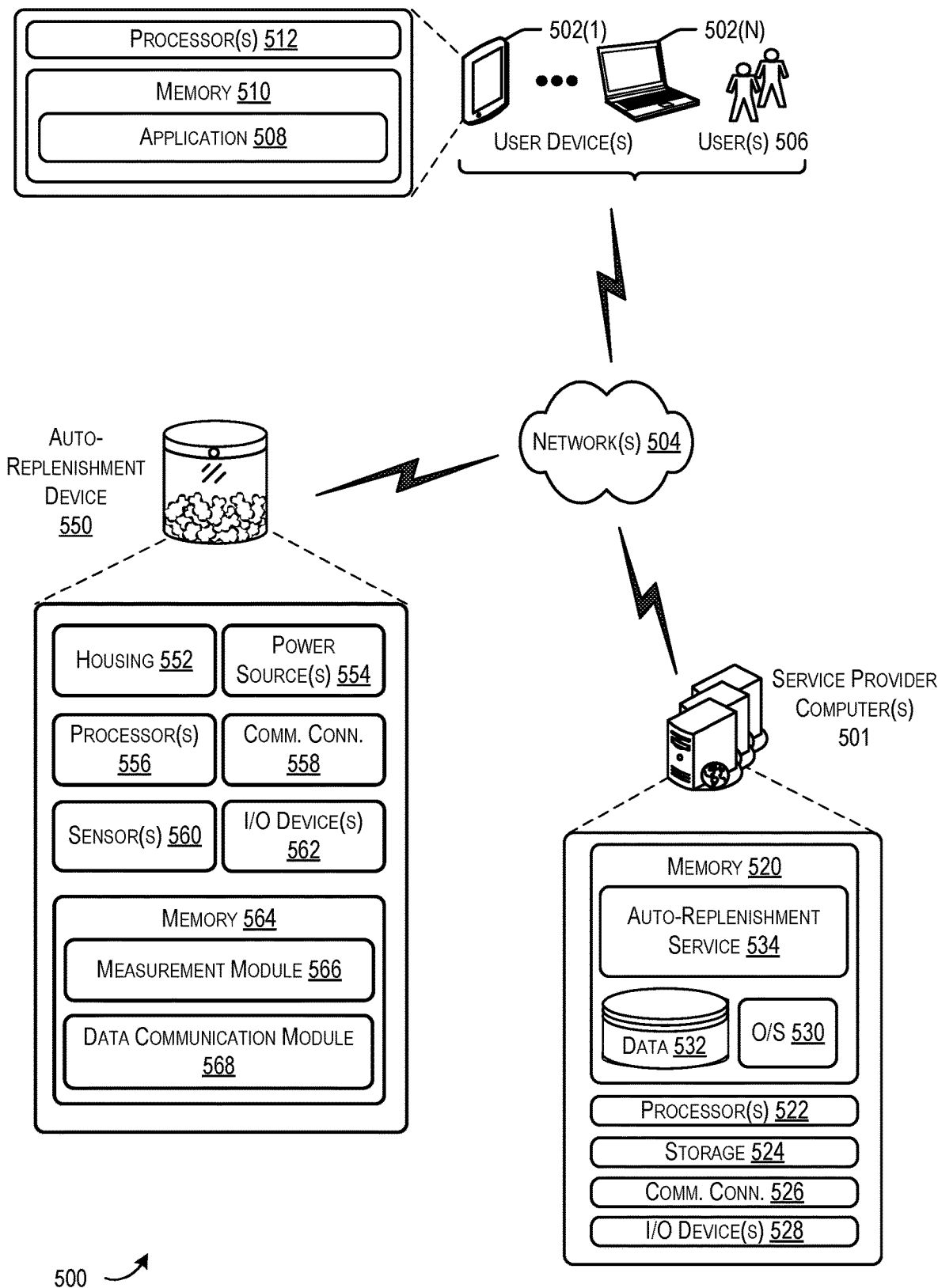
FIG. 5 illustrates an example computer network architecture 500 for generating an electronic request for a replacement of an item based on sensor data of an ARD indicating an amount of the item stored by the ARD, in accordance with at least one embodiment.

FIG. 5 illustrates an example computer network architecture 500 for generating an electronic request for a replacement of an item based on sensor data of an ARD indicating an amount of the item stored by the ARD, in accordance with at least one embodiment. As illustrated, the computer network architecture 500 may include one or more service provider computer(s) 501 (e.g., the service provider computer(s) 102 of FIG. 1), one or more user device(s) 502 (e.g., the user device 106 of FIG. 1), and/or an ARD 550 (e.g., the ARD 104 of FIG. 1) connected via one or more network(s) 504. One or more user(s) 506 (e.g., customers, users, consumers, etc.) may utilize user computing device(s) 502(1)(N) (collectively, the user device(s) 502) to access application 508 (e.g., a browser application, a shopping application, etc.) or a user interface (UI) accessible through the application 508. In embodiments, the user device(s) 502 may include one or more components for enabling the user(s) 506 to interact with the application 508.

The user device(s) 502 may include at least one memory 510 and one or more processing units or processor(s) 512. The memory 510 may store program instructions that are loadable and executable on the processor(s) 512, as well as data generated during the execution of these programs. Depending on the configuration and type of the user device(s) 502, the memory 510 may be volatile (such as random access memory (RAM)) and/or non-volatile (such as read-only memory (ROM), flash memory, etc.). The user device(s) 502 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user device (s 502. In some implementations, the memory 510 may include multiple different types of memory, such as static random access memory (SRAM), dynamic random access memory (DRAM), or ROM.

Turning to the contents of the memory 510 in more detail, the memory 510 may include an operating system and one or more application programs or services for implementing the features disclosed herein. Additionally, the memory 510 may include one or more modules for implementing the features described herein including the automatic replenishment service 534.

The architecture 500 may also include one or more service provider computer(s) 501 that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computer(s) 501 may implement or be an example of the service provider computer(s) described herein. The one or more service provider computer(s) 501 may also be operable to provide site hosting, media streaming services, computer application development, and/or implementation platforms, combinations of the foregoing, or the like to the one or more user(s) 506 via user device(s) 502.

In some examples, the network(s) 504 may include any one or a combination of many different types of networks, such as cable networks, the Internet, wireless networks, cellular networks, and other private and/or public networks. While the illustrated examples represent the user(s) 506 communicating with the service provider computer(s) 501 over the network(s) 504, the described techniques may equally apply in instances where the user(s) 506 interact with the one or more service provider computer(s) 501 via the one or more user device(s) 502 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computer(s) 501 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computer(s) 501 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computer(s) 501 may be in communication with the user device(s) 502 and/or the ARD 550 via the network(s) 504, or via other network connections. The one or more service provider computer(s) 501 may include one or more servers, perhaps arranged in a cluster or as individual servers not associated with one another.

In one illustrative configuration, the one or more service provider computer(s) 501 may include at least one memory 520 and one or more processing units or processor(s) 522. The processor(s) 522 may be implemented as appropriate in hardware, computer-executable instructions, firmware, or combination thereof. Computer-executable instruction or firmware implementations of the processor(s) 522 may include computer-executable or machine-executable instructions written in any suitable programming language to perform the various functions described when executed by a hardware computing device, such as a processor. The memory 520 may store program instructions that are loadable and executable on the processor(s) 522, as well as data generated during the execution of these programs. Depending on the configuration and type of the one or more service provider computer(s) 501, the memory 520 may be volatile (such as RAM) and/or non-volatile (such as ROM, flash memory, etc.). The one or more service provider computer(s) 501 or servers may also include additional storage 524, which may include removable storage and/or non-removable storage. The additional storage 524 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 520 may include multiple different types of memory, such as SRAM, DRAM, or ROM.

The memory 520, the additional storage 524, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 520 and the additional storage 524 are all examples of non-transitory computer storage media. Additional types of non-transitory computer storage media that may be present in the one or more service provider computer(s) 501 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computer(s) 501. Combinations of any of the above should also be included within the scope of non-transitory computer-readable media.

The one or more service provider computer(s) 501 may also contain communication connection interface(s) 526 that allow the one or more service provider computer(s) 501 to communicate with a data store, another computing device or server, user terminals, and/or other devices on the network(s) 504. The one or more service provider computer(s) 501 may also include I/O device(s) 528, such as a keyboard, a mouse, a pen, a voice input device, a touch input device, a display, speakers, a printer, etc.

Turning to the contents of the memory 520 in more detail, the memory 520 may include an operating system 530, one or more data stores 532, and/or one or more application programs or services for implementing the features disclosed herein including the automatic replenishment service 534 (e.g., an example of the automatic replenishment service 118 of FIG. 1). In accordance with at least one embodiment, the automatic replenishment service 534 may be configured to maintain a profile associated with the ARD 550, determine a current amount of an item stored by the ARD 550, determine consumption data of the item, generate electronic requests for replacement amounts, or the like. Further, the profile may be stored in the data stores 532, where also rules and constraints are stored. The automatic replenishment service 534 may customize the electronic requests based on such rules and constraints.

The architecture 500 also includes the ARD 550. As disclosed herein, the ARD 550 may be configured, among other things, to utilize sensor(s) 560 to obtain sensor data associated with items situated within or on the ARD 550 (e.g., in a container or on a surface of the ARD 550 as described in connection with FIGS. 2 and 3).

The ARD 550 (or a portion of the ARD 550 such as the ARD lid 302 of FIG. 3) may include a housing 552 that may include components of ARD 550 discussed further below. In embodiments, the housing 552 may be composed of any type of material (e.g., plastic, metal, etc.), and may serve to prevent the components of the ARD 550 from being damaged or interacting or otherwise contaminating the items placed within ARD 550.

The ARD 550 may include one or more power source(s) 554 that provide power to one or more components of the ARD 550. The power source(s) 554 may include a battery, which may include a one-time use battery or a rechargeable battery. However, the power source(s) 554 may rely on power from another source providing alternating current (AC) power and may be a power inverter. For example, the ARD 550 may be powered via a power cord that is coupled to the ARD 550 and that is detachably connected to a power outlet, such as a wall outlet. In some embodiments, the ARD 550 may include a power level detector that is configured to determine and display a power level for the ARD 550 using alpha-numeric characters that indicate a current power level of a battery of the ARD 550 and power source(s) 554. The power level may be transmitted by the ARD 550 to a remote computing device (e.g., the service provider computer(s) 102 of FIG. 1), which may track the power level of the power source(s) 554 over time. In some embodiments, the ARD 550 and/or the remote computing device may provide a notification (e.g., to a client device not pictured) of the power level via any suitable means such an e-mail message, a text message, a mobile application, a website, etc.

The ARD 550 may include at least one memory (e.g., memory 564) and one or more processing units (e.g., processor(s) 556). The processor(s) 556 may be implemented as appropriate in hardware. Computer-executable instructions, software or firmware implementations of the processor(s) 556 may include computer-executable or machine-executable instructions written in any suitable programming language to perform the various functions described.

The memory 564 may include more than one memory and may be distributed throughout the ARD 550. The memory 564 may store program instructions (e.g., related to a measurement module 566 and/or a data communication module 568) that are loadable and executable on the processor(s) 556, as well as data generated during the execution of these programs. Depending on the configuration and type of memory, the memory 564 may be volatile (such as random access memory (RAM)) and/or non-volatile (such as read-only memory (ROM), flash memory, or other memory). In some implementations, the memory 564 may include multiple different types of memory, such as static random access memory (SRAM), dynamic random access memory (DRAM), or ROM.

Turning to the contents of the memory 564 in more detail, the memory 564 may include one or more application programs, modules or services for implementing the features disclosed herein including measurement module 566 and/or the data communication module 568. The measurement module 566 may include instructions that, when executed by the processor(s) 556 may cause sensor(s) 560 of the ARD 550 to capture sensor data including distance measurements and/or weight measurements associated with the items placed on, or within, the ARD 550. A distance measurement may quantify a distance between the sensor(s) 560 and the item on/within the ARD 550. The memory 564 may be configured to store the collected sensor data. In some embodiments, the measurement module 566 may be configured to convert raw sensor data into any suitable format and/or unit. The measurement module 566 may be configured to provide the sensor data and/or converted sensor data to the data communications module 568.

In some embodiments, the memory may also store a device serial number (DSN), a device registration identifier, and an encryption key of the ARD 550. The data communication module 568 may include instructions that, when executed by the processor(s) 556, transmit and receive message via communication connection(s) 558. The data communication module 568 may be configured to generate a hash based on the device registration identifier, generate messages that include the sensor data and/or converted sensor data, the DSN, and the hash, encrypt the messages based on the encryption key, and transmit the encrypted. The communication connection(s) 558 may include suitable communication interfaces for communicating via Bluetooth (Bluetooth Low Energy (BLE)), WiFi, a cellular connection (e.g., 3G, 5G, LTE, etc.). The communication connection(s) 558 may be configured to transmit the messages (encrypted as applicable) to a remote computing device (e.g., the service provider computer(s) 501) or relay data to the remote computing device using a proxy device (e.g., a smartphone, a laptop, a desktop computer, or any suitable device capable of performing data transfers with the remote computing device). The communication connection(s) 558 any may utilize known or widely used communication protocols such as a wireless connection (WiFi network), a wired connection to a network, cellular network, short-range or near-field networks (e.g., Bluetooth), infrared signals, local area networks, wide area networks, the Internet, etc.

In at least one embodiment, the data communication module 568 may be configured to obtain sensor data from the measurement module 566 and/or the memory 564. The data communication module 568 may be responsible for transmitting such sensor data in messages to a remote computing device (e.g., the service provider computer(s) 102) according to any suitable communications protocol. The sensor data may be communicated in any manner, such as via Bluetooth (Bluetooth Low Energy (BLE) may also be considered when using the term "Bluetooth"), WiFi, a cellular connection (e.g., 3G, 5G, LTE, etc.), and so on.

In at least one embodiment, the data communication module 568 may be configured to receive data via the communication connection(s) 558. For example, the data communication module 568 may be configured to receive item information (e.g., an item identifier, unit weight, material consistency, or any suitable attribute of an item) indicating an item that is placed on or within the ARD 550. In some embodiments, the item information or other suitable information communicated to the data communication module 568 may include/indicate conversion algorithms for converting raw sensor data into a particular format and/or unit. In still further embodiments, the data communication module 568 may be configured to receive any suitable information for instructing the measurement module 566 in a manner of collecting sensor data utilizing sensor(s) 560. By way of example, an instruction may be received by the data communication module 568 and communicated to the measurement module 566 that indicates that sensor data is to be collected according to a provided schedule, at a particular periodic rate, or the like. Generally, any suitable data that is to be transmitted or received by the ARD 550 may be processed by the data communication module 568 and provided to any other module and/or component of the ARD 550.

The ARD 550 may include sensor(s) 560 such as a time of flight sensor, or other suitable sensors such as time of flight camera sensors, scale sensors, or infrared sensors that are configured to obtain or capture sensor data of items placed on and/or within the ARD 550. The time of flight sensors may include signal transmitters and receivers that are configured to determine an amount, quantity, and/or volume of an item stored on and/or within the ARD 550 or calculate a distance from the source of the signal to the receptor of the signal which can be converted into an amount of the item stored on and/or within the ARD 550.

The sensor(s) 560 may be configured to periodically obtain sensor data regarding the items placed on or within the ARD 550 at predetermined intervals, such as every day, every twelve hours, every six hours, every hour, every fifteen minutes, and so on. In some embodiments, the sensor(s) 560 may determine/sense when an item is placed on or within the ARD 550, which may cause the sensor(s) 560 to obtain sensor data associated with the item(s). The sensor(s) 560 may also be instructed (e.g., by the measurement module 566) to obtain sensor data via instructions initiated at a remote computing device (e.g., the service provider computer(s) 102). The frequency of sensor data collection performed by the sensor(s) 560 may be adjusted over time, which may be based on the rate of consumption of the items and/or the manner in which the ARD 550 is being powered. For instance, if the ARD 550 is being powered via a power cord and power outlet, the sensor data may be obtained more frequently (e.g., every hour, every fifteen minutes, etc.). However, if the ARD 550 is being powered using a battery, the sensor data may be collected less frequently to conserve battery life.

The ARD 550 may also include input/output (I/O) device(s) 562 and/or ports, such as for enabling connection with a keyboard, a mouse, a pen, a voice input device, a touch input device, a display, speakers, a printer, or other I/O device. The I/O device(s) 562 may be in any suitable form to enable data to be provided to any suitable component of the ARD 550 and/or for presenting information (e.g., text, lights, sounds) at the ARD 550 (e.g., via speaker, a display, haptic feedback, etc.).

FIGS. 6-9 illustrate examples of flows for generating an electronic request for a replacement of an item based on sensor data of an ARD indicating an amount of the item stored by the ARD. A computer system hosting an automatic replenishment service, such as the server provider computer(s) 501 of FIG. 5, may be configured to perform the illustrative flows in some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered. Further, some of the operations are similar between the flows. In the interest of brevity, the similarities are not repeated.

Figure 6:
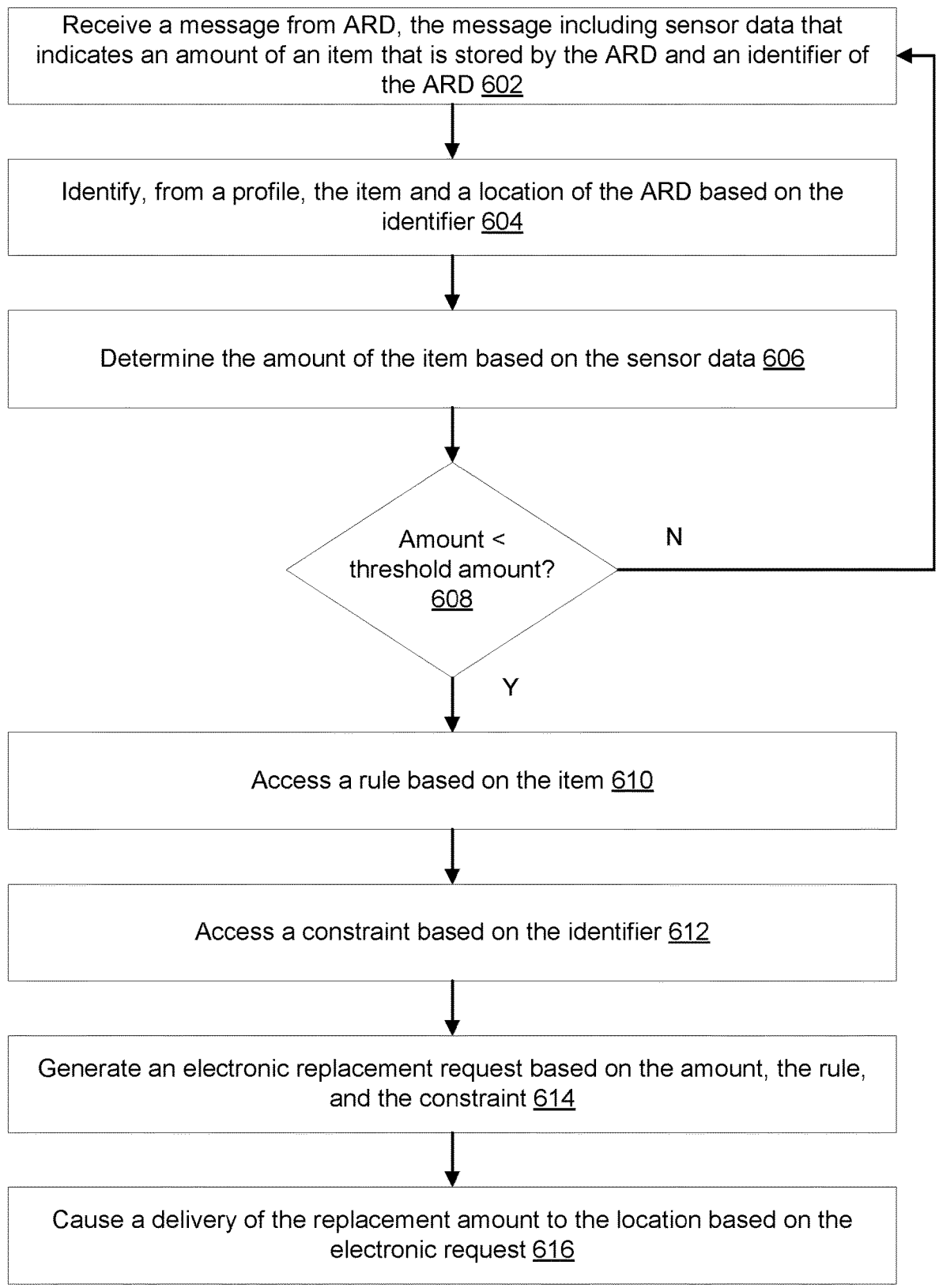
FIG. 6 illustrates an example end-to-end flow for generating an electronic request for a replacement amount of an item based on sensor data of an ARD indicating an amount of the item stored by the ARD, in accordance with at least one embodiment.

FIG. 6 illustrates an example end-to-end flow for generating an electronic request for a replacement amount of an item based on sensor data of an ARD indicating an amount of the item stored by the ARD, in accordance with at least one embodiment. The example flow may start at operation 602, where the computer system may receive a message from the ARD over a data network. In an example, the message may include sensor data and an identifier of the ARD. The sensor data may be generated by the sensor of the ARD and may indicate an amount of an item that is stored by the ARD. Over time, the computer system may receive multiple messages from the ARD. The sensor data in these messages may indicate the consumption of the item by showing changes to the amount of the item stored by the ARD over time.

At operation 604, the computer system may identify, from a profile associated with the ARD (e.g., a device profile), the item and a delivery location (e.g., a user location where the ARD is located) based on the identifier of the ARD from the message. For example, the identifier of the ARD is used to search different profiles accessible to the computer system until the profile is found. That profile may include an identifier of the item associated with the identifier of the ARD.

At operation 606, the computer system may determine the amount of the item based on the sensor data from the message. In an example, this amount may represent the current amount. As explained herein above, different messages may be received over time, each including sensor data that may be stored in the profile. The computer system may convert the stored sensor data into amounts of the item over time. Changes to the amounts may be tracked to determine the current amount.

At operation 608, the computer system may determine whether the amount (e.g., the current amount) is less than a threshold amount. For example, the current amount (e.g., expressed in weight, volume, number of units) may be compared to the threshold amount (e.g., expressed as a predefined percentage of a full amount that the ARD can store). If less than the threshold amount, operation 610 may be performed because the computer system may determine that it is time to generate an electronic request for a replacement amount. Otherwise, the computer system may loop back to operation 602 to receive a subsequent message from the ARD because the replacement amount is not currently needed.

At operation 610, the computer system may access a rule based on the item. In an example, the rule specifies a customization of the electronic request for the replacement amount of the item. The computer system may use the identifier of the item from the profile to look up various rules (e.g., promotional rules) stored in a database. Each rule may be associated with one of the item identifiers. The matched rule(s) may be then applied to customize the electronic request.

At operation 612, the computer system may access a constraint based on the identifier of the ARD. In an example, the constraint specifies a limit on the customization of the electronic request based a past customization associated with the identifier of the ARD. The computer system may use the identifier of the ARD to look up various constraints (e.g., promotional constraints) stored in a database. The matched rule(s) may limit the customization based on a history of customizations of past electronic requests made on behalf of the ARD. The history may be stored and accessed from the profile.

At operation 614, the computer system may generate the electronic request for the replacement amount of the item based on the amount of the item (e.g., on the current amount being less than the threshold amount), on the customization specified by the rule, and on the limit specified by the constraint. In an example, the electronic request may identify the item (e.g. by including the item identifier), the delivery location (e.g., by including the user location), the ARD (e.g., by including the identifier of the ARD), and other information relevant to acquiring the replacement amount from a storage facility and shipping of this amount to the delivery location (e.g., the electronic request may also identify a user account associated with a user of the ARD and may include payment information from the user account). This electronic request may be customized according to the rule and constraint. For instance, if the rule specifies a discount and the constraint allows the discount, the payment information may be updated to reflect this discount. Similarly, if the rule specifies a substitute item and the constraint allows this substitution, the item identifier may be updated to instead include the identifier of the substitute item.

At operation 616, the computer system may cause a delivery of the replacement amount to the user location based on the electronic request. In an example, the electronic request may be used by a back-end system to obtain the replacement amount of item from the storage facility. The back-end system may further generate delivery instructions to allocate delivery resources and schedule the delivery of the replacement amount from the storage facility to the delivery location. In this way, the messages transmitted by the ARD may be used by the computer system to generate new data (e.g., the electronic request identifying the ARD) that is then used for the customization of the delivery of the replacement item. In addition, the computer system may identify a user device or an electronic address of the user from the user account. The computer system may send a notification about an initiation of the delivery to the user device and/or to the electronic address.

Figure 7:
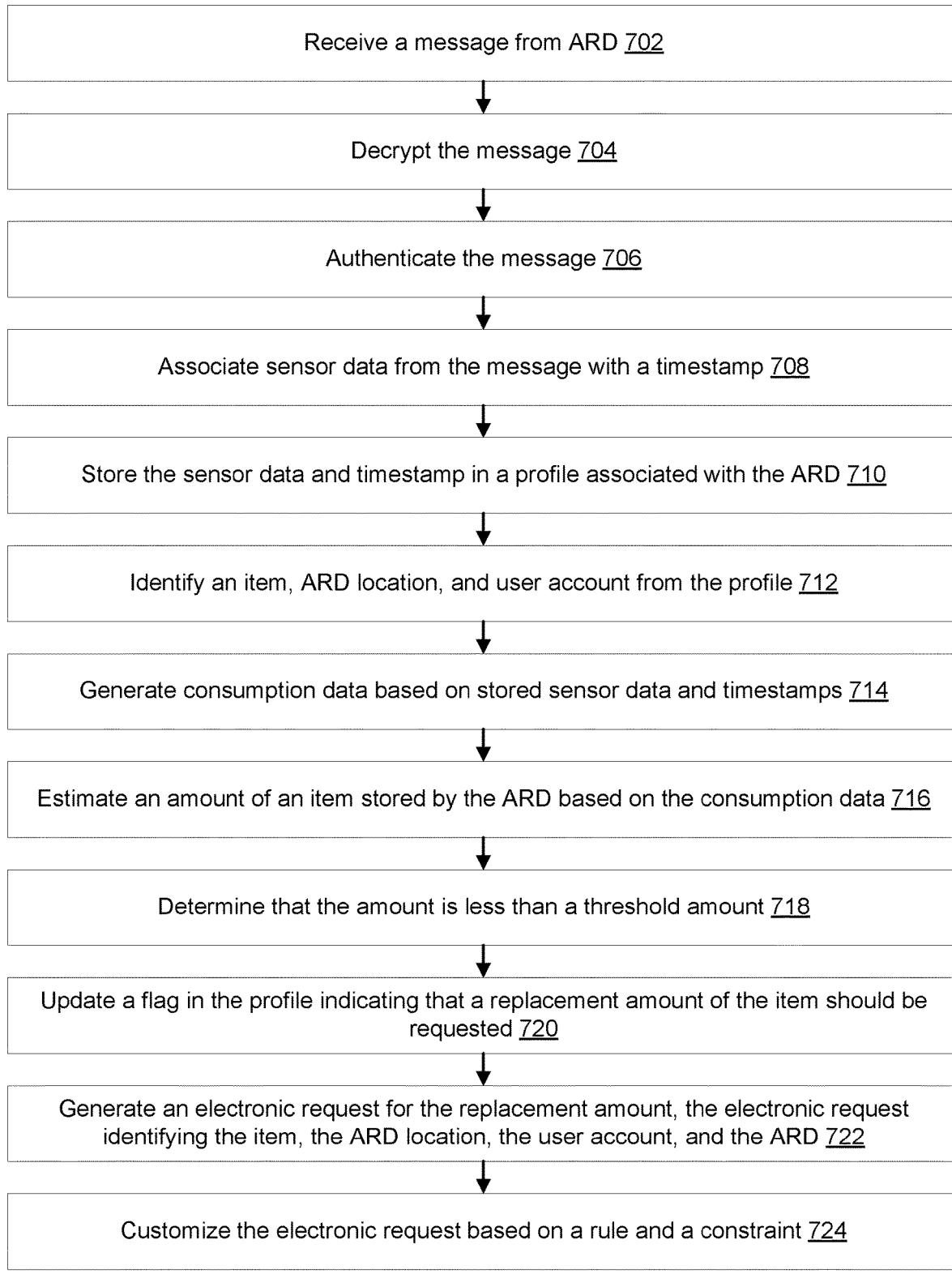
FIG. 7 illustrates an example detailed flow for generating the electronic request, in accordance with at least one embodiment.

FIG. 7 illustrates an example detailed flow for generating the electronic request, in accordance with at least one embodiment. The example flow may start at operation 702, where the computer system may receive a message from the ARD. In an example, the message is encrypted for security. For instance, the encryption may use a public key of the computer system. At operation 704, the computer system may decrypt the message. For instance, the computer system may use its private key for the decryption.

At operation 706, the computer system may authenticate the message once decrypted. In an example, the message may include sensor data, the identifier of the ARD, and a hash. The hash may have been generated by the ARD by at least hashing the sensor data and/or the identifier of the ARD according to hash function that uses a registration identifier stored at the ARD. The computer system may access the sensor data and/or the identifier of the ARD, generate a hash therefrom by applying the same hash function according to its local copy of the registration identifier, and may compare the generated hash with the received hash. If the hashes match, the message may be authenticated. If unauthenticated, the message may be disregarded.

At operation 708, the computer system may associate the sensor data from the message (upon verification) with a timestamp. In an example, the computer system may receive the message at a particular point in time and may generate a timestamp corresponding to that particular point in time.

At operation 710, the computer system may store the sensor data and the timestamp in the profile associated with ARD, along with the sensor data. In this way, the sensor data may be timestamped and stored in the profile. In an example, the identifier of the ARD from the message may be used to retrieve the profile. The profile may then be updated to log the sensor data and the timestamp.

At operation 712, the computer system may identify the item, the ARD location (or, similarly, the delivery location), and the user account from the profile. In an example, the profile may store the identifier of the item and the ARD location, and may be linked to the user account.

At operation 714, the computer system may generate consumption data based on stored sensor data and timestamps from the profile (e.g., based on the sensor data from the received message, the timestamp of that sensor data, additional sensor data received in previous messages, and additional timestamps of the additional sensor data). In an example, the computer system may generate a consumption rate curve showing changes to the amount of the item stored by the ARD over time given the sensor data and the timestamps. For instance, if the sensor data includes weight data, the original weight stored by the ARD may be determined from the first received message. Weight data received in subsequent messages may indicate changes to the original weight (e.g., decrease). By tracking these changes over time, a consumption rate curve may be generated indicating the consumption of the amount of the item over time.

At operation 716, the computer system may estimate an amount of the item (e.g., the current amount) stored by the ARD based on the consumption data. In an example, the consumption rate curve may show the changes to the original amount (e.g., the original weight, original volume, original number of units, etc.). The changes over time may be combined to determine the current amount from the original amount.

At operation 718, the computer system may determine that the amount of the item (e.g., the current amount) is less than a threshold amount. At operation 720, the computer system may update a flag in the profile indicating that a replacement amount of item should be replenished. In other words, because the amount of the item is less than the threshold amount, the computer system may update the value of the flag to a predefined value (e.g., from a "0" to a "1") to indicate that an electronic request should be generated to send a replacement amount of the item to the ARD location. Operations for setting and resetting the flag to manage the generation of the electronic request are further described in connection with FIG. 8.

At operation 722, the computer system may generate the electronic request for the replacement amount. In an example, the electronic request identifies the item, the ARD location, the user account, and the ARD.

At operation 724, the computer system may customize the electronic request based on a rule and a constraint. In an example, operations 722 and 724 may be combined such that the generated electronic request is already customized. In another example, operation 724 may be performed following operation 722 such that electronic request may be generated by one service hosted on the computer system (e.g., an automatic replenishment service), while its customization may be performed by another service hosted on the computer system (e.g., a back-end service).

Furthermore, once the electronic request is generated (and, possibly customized), the back-end service may further process it to obtain the replacement amount. If that amount is current unavailable from the storage facility, an indication of the unavailability may be provided back to the automatic replenishment service. This service may then update the electronic request to identify another substitute item as specified in the rules.

Figure 8:
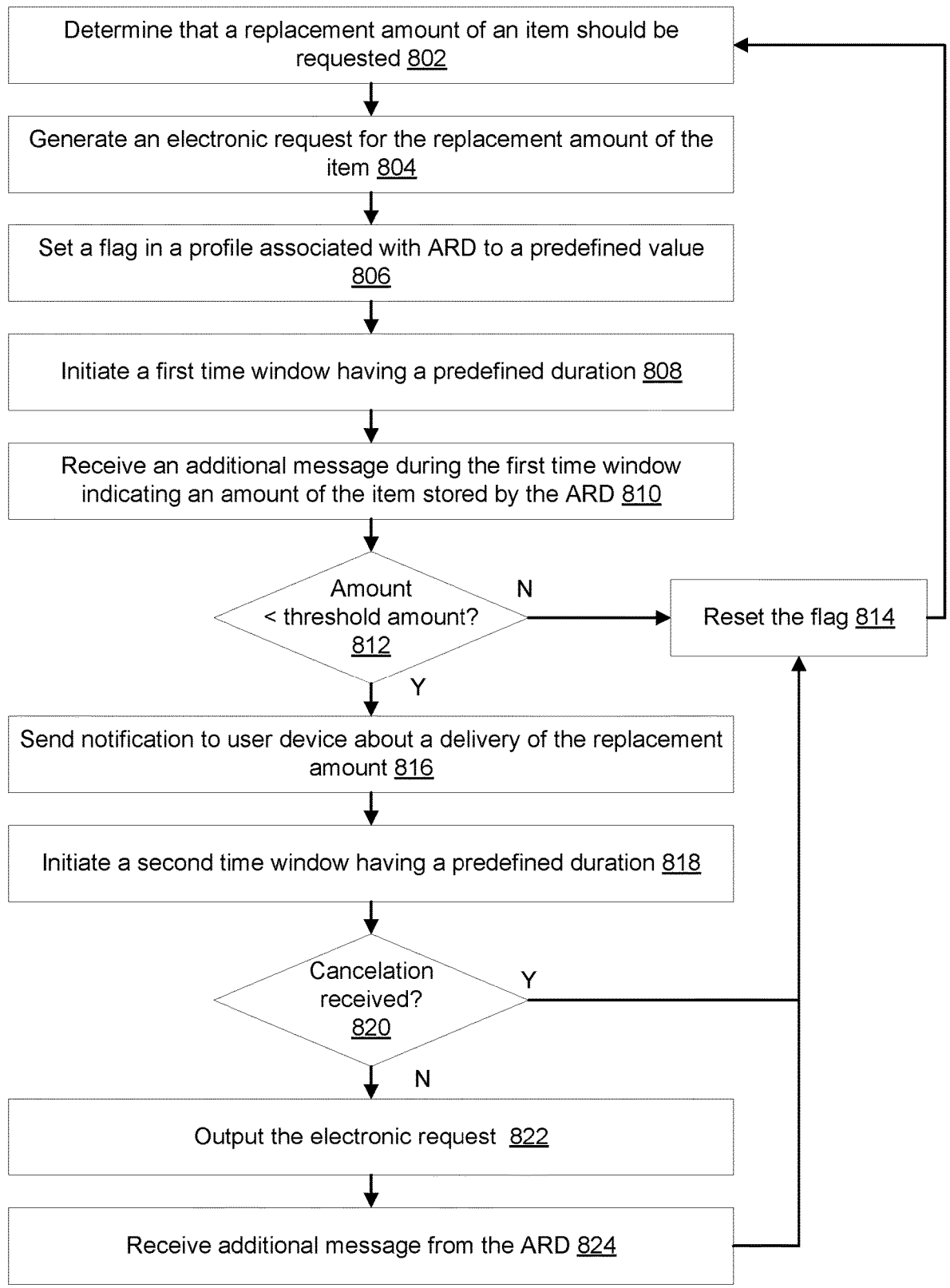
FIG. 8 illustrates an example flow for using a flag to manage the process of generating an electronic request, in accordance with at least one embodiment.

FIG. 8 illustrates an example flow for using a flag to manage the process of generating an electronic request, in accordance with at least one embodiment. The flag may be set to a predefined value to indicate that the replacement amount should be requested, where the decision to generate the electronic request may be based on a message received from the ARD at a particular point in time. Because the consumption is monitored over time, a subsequent message may be received before the delivery of the replacement item for example. To avoid generating a second electronic request which would be redundant (and unnecessarily use underlying computational processing and data storage, in addition to causing the incorrect delivery of an additional replacement amount), the predefined value may indicate that an electronic request already exists.

The example flow may start at operation 802, where the computer system may determine that the replacement amount should be requested. At operation 804, the computer system may generate the electronic request for the replacement amount.

At operation 806, the computer system may set the flag in the profile to the predefined value based on the generation of the electronic request. At operation 808, the computer system may initiate a first time window having a predefined duration (e.g., twelve hours). This time window starts after the generation of the electronic request and may be used to monitor additional messages received from the ARD.

At operation 810, the computer system may receive an additional message during the first time window. This additional message (or, more specifically, the included sensor data) may indicate an amount of the item currently stored by the ARD (e.g., the current amount).

At operation 812, the computer system may compare the amount to a threshold amount. If larger than the threshold amount, operation 814 may be performed. Otherwise, operation 816 may be performed upon the elapse of the first time window. This threshold amount (e.g., a cancelation threshold amount) may be larger than the threshold amount (e.g., a reorder threshold amount) described in connections with operations 608 and 718. For example, the cancelation threshold amount may be a predefined percentage value (e.g., five percent) larger than the reorder threshold amount. By using a larger value, any fluctuation in the sensor data received in the messages from the ARD (e.g., based on the sensitivity of the ARD's sensor(s)), may be accounted for such that this fluctuation may not cause incorrectly resetting the flag.

At operation 814, the computer system may reset the flag. For example, the predefined value may be changed back to a default value (e.g., from a "1" to a "0"). The computer system may do so because the current amount is larger than the threshold amount. This indicates that, even before the electronic request has been fully processed and the replacement amount shipped out, the user of the ARD may have refilled the ARD with a surplus amount that was already available to the user. Because the current amount is now larger than the threshold value, the computer system may cancel the electronic request by resetting the flag and may loop back to operation 802.

At operation 816, the computer system may send a notification to the user device about the delivery of the replacement amount. In an example, upon the elapse of the first time window, if the flag is still set to the predefined time window, the computer system may determine that the replacement amount is actually needed and may proceed with the processing of the electronic request. Nonetheless, the user may be given the option to cancel the electronic request and avoid the delivery of the replacement amount altogether. In particular, the notification may be presented on a user device and may identify the ARD, the item, the replacement amount, the expected ship date, and the expected delivery date. The presented notification may also provide a selectable option to cancel the shipment.

At operation 818, the computer system may initiate a second time window having a predefined duration (e.g., eight hours). This time window may start after the notification has been transmitted and may be used to monitor whether a selection of the cancelation option is received or not.

At operation 820, the computer system may determine whether a cancelation of the delivery is received during the second time window. In an example, the user may select the cancelation option from the notification via the user device. Information about this selection may be transmitted to and received by the computer system. If the cancelation is detected, the computer system may loop back to operation 814 to reset the flag, thereby canceling the electronic request. Otherwise, operation 822 may be performed upon the elapse of the second time window.

At operation 822, the computer system may output the electronic request. For example, the automatic replenishment service may generate (and, possibly, customize) the electronic request and may provide it to the back-end service for further processing.

At operation 824, the computer system may receive an additional message from the ARD. This message may indicate that the current amount of the item stored by the ARD is larger than the threshold amount. Because the electronic request may have already been processed, the computer system may determine that this current amount is due to the delivery of the replacement amount. Accordingly, the computer system may loop back to operation 814 to reset the flag. In this case, the monitoring of the amount and the decision to generate a new electronic request start anew.

Figure 9:
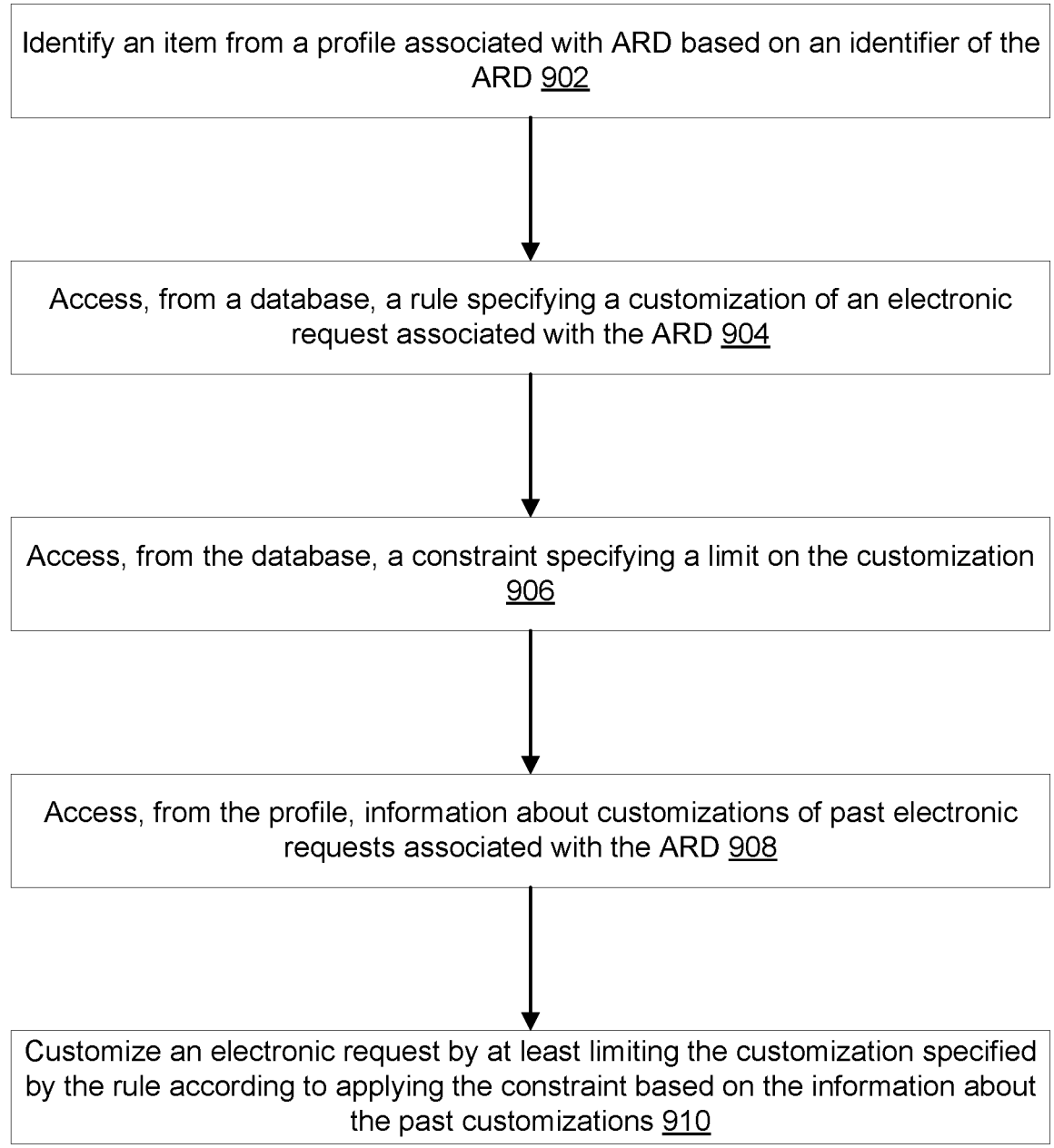
FIG. 9 illustrates an example flow for using rules and constrains to customize an electronic request, in accordance with at least one embodiment.

FIG. 9 illustrates an example flow for using rules and constrains to customize an electronic request, in accordance with at least one embodiment. The example flow may start at operation 902, where the computer system identifies the item (e.g., an item identifier) from the profile associated with the ARD based on the identifier of the ARD. At operation 904, the computer system may access, from a database, a rule specifying a customization of an electronic request associated with the ARD. In an example, the computer system queries the database using the item identifier and the query response may return the rule.

At operation 906, the computer system may access, from a database, a constraint specifying a limit on the customization. In an example, the computer system queries the database using the item identifier and the query response may return the constraint.

At operation 908, the computer system may access, from the profile, information about customizations of past electronic requests associated with the ARD. For example, the profile may store a counter for each type of customization (e.g., promotion, substitute item recommendation, etc.) that is incremented each time the relevant customization is applied to an electronic request generated on behalf of the ARD. The constraint may limit the customization given the value of the applicable counter At operation 910, the computer system may customize the electronic request by at least limiting the customization specified by the rule according to applying the constraint based on the information about the past customizations. For instance, if a promotion indicates a ten percent discount for the first two replacement amounts and if the counter has a value larger than two, that promotion may not be applied or the promotion may be modified to a different discount (e.g., to a five percent discount).

Figure 10:
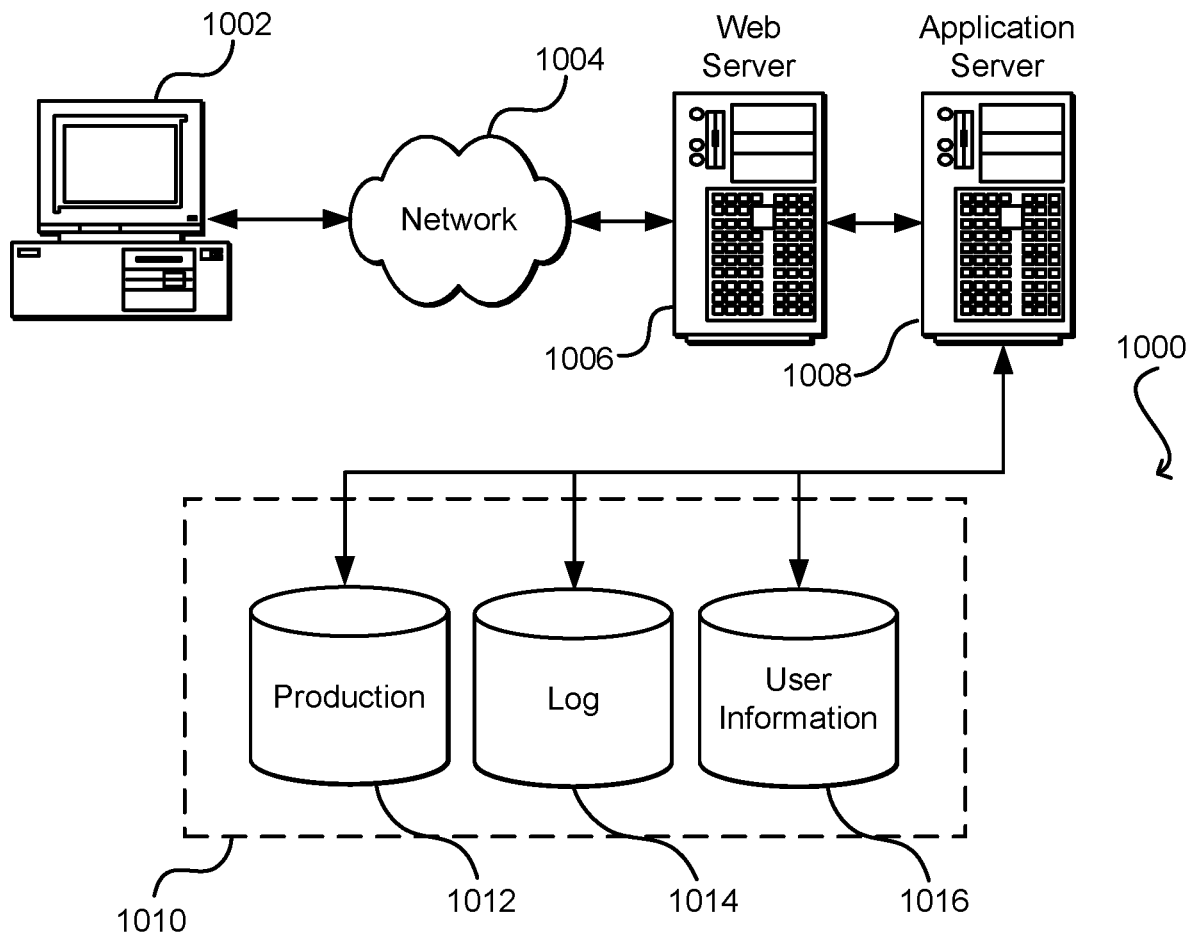
FIG. 10 illustrates aspects of an example environment for implementing aspects in accordance with various embodiments.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    an automatic replenishing device (ARD) associated with a device profile, comprising a sensor, and located at a user location, the ARD configured to generate sensor data based at least in part on a sensed change to the sensor data, the ARD further configured to send a message at a time interval, the message comprising a header and a payload, the payload comprising the sensor data and an identifier of the ARD stored in a memory of the ARD, the payload encrypted with a first encryption key;
    a computer system communicatively coupled with the ARD over a data network and comprising a processor and a memory, the memory storing the device profile and computer-readable instructions, the computer-readable instructions upon execution by the processor cause the computer system to perform operations comprising:
        receiving the message from the ARD at the time interval and over the data network;
        decrypting the payload based at least in part on a second encryption key;
        determining the identifier and the sensor data from the payload;
        generating, based at least in part on an authentication of the message, a timestamp associated with the message;
        identifying, from the device profile, an item and the user location based at least in part on the identifier of the ARD;
        storing the sensor data and the timestamp in the device profile;
        determining an amount of the item stored by the ARD based at least in part on a plurality of sensor data and a plurality of timestamps stored in the device profile;
        accessing, from one or more database by using an identifier of the item in a first database query, a rule that specifies a customization of an electronic request for a replacement amount of the item, the rule applicable to the item or a category of the item independently of the ARD;
        accessing, from the one or more databases by using the identifier of the ARD, a constraint that limits an application of the rule to the customization of the electronic request;
        determining, from the device profile, a past customization associated with the identifier of the ARD;
        determining a limit on the customization of the electronic request based at least in part on the constraint and the past customization;
        generating the electronic request for the replacement amount of the item based at least in part on the amount of the item, on the customization specified by the rule, and on the limit, the electronic request identifying the item, the user location, and the ARD; and
        causing a delivery of the replacement amount to the user location based at least in part on the electronic request.

2. The system of claim 1, wherein the payload further comprises a hash generated based at least in part on a registration identifier of the ARD, and wherein the authentication is based at least in part on the hash.

3. The system of claim 1, wherein the sensor data comprises raw data, and wherein the raw data comprises at least one or more of: weight data or optical data, and wherein the operations of the computer system further comprise:
    generating consumption data based at least in part on the sensor data, the timestamp, the plurality of sensor data, and the plurality of timestamps; and
    estimating the amount of the item based at least in part on the consumption data.

4. The system of claim 1, wherein the operations further comprise: comparing the amount of the item to a threshold amount stored in the device profile, and wherein the electronic request is generated based at least in part on the comparing.

5. A computer-implemented method, comprising:
    receiving, by a computer system over a data network, a message from a device that is associated with an identifier of the device, the message comprising a header and a payload, the payload comprising the identifier and sensor data that indicates an amount of an item, the payload encrypted with a first encryption key;
    decrypting the payload based at least in part on a second encryption key;
    determining the identifier and the sensor data from the payload;
    storing, based at least in part on an authentication of the message, a timestamp associated with the message and the sensor data in a profile;
    determining, by the computer system, the amount of the item based at least in part on a plurality of sensor data and a plurality of timestamps stored in the profile;
    determining, based at least in part on an identifier of the item, a rule that specifies a customization of an electronic request for a replacement amount of the item, the rule applicable to the item or a category of the item independently of the device;
    determining, based at least in part on the identifier of the device, a constraint that limits an application of the rule to the customization;
    determining, from the profile, a past customization associated with the identifier of the device;
    determining a limit on the customization based at least in part on the constraint and the past customization;
    generating, by the computer system, the electronic request for the replacement amount of the item based at least in part on the amount of the item and the limit on the customization.

6. The computer-implemented method of claim 5, wherein the device is an automatic replenishment device (ARD) that is associated with the profile, wherein the electronic request further identifies a location that is associated with the ARD in the profile, wherein the constraint specifies the limit based at least in part on a past customization stored in the profile, and further comprising:
- identifying, by the computer system, the item from the profile based at least in part on the identifier associated with the device; and
- causing, by the computer system, a delivery of the replacement amount to the location based at least in part on the electronic request.

7. The computer-implemented method of claim 5, further comprising:
- updating, by the computer system based at least in part on the electronic request, a flag stored in the profile associated with the device, the flag indicating that the electronic request was generated based at least in part on the updating.

8. The computer-implemented method of claim 7, further comprising:
- resetting, by the computer system, the flag based at least in part on an event, the flag indicating that an additional electronic request for the replacement amount can be generated based at least in part on the resetting, the event comprising at least one of: an additional sensor data indicating that an updated amount of the item stored by the device exceeds a threshold amount, or a user request for a cancellation of a delivery of the replacement amount;
- receiving, by the computer system over the data network, an additional message from the device, the additional message comprising additional sensor data and the identifier associated with the device; and
- generating, by the computer system, the additional electronic request based at least in part on the flag being reset.

9. The computer-implemented method of claim 7, wherein updating the flag comprises:
- determining that the amount of the item is less than a threshold amount;
- setting the flag in the profile to a predefined value based at least in part on the amount being less than the threshold amount;
- initiating a time window having a predefined duration based at least in part on the predefined value of the flag in the profile;
- receiving additional sensor data during the time window, the additional sensor data indicating an updated amount of the item stored by the device;
- determining that the updated amount is less than the threshold amount; and
- storing the additional sensor data in the profile and avoiding generating an additional electronic request for the replacement amount based at least in part on the predefined value of the flag in the profile.

10. The computer-implemented method of claim 9, further comprising:
- upon an elapse of the time window, sending, by the computer system, a notification to a user device associated with the device and initiating, by the computer system, a second time window having a different predefined duration, the notification presented on the user device and including an option to cancel a delivery of the item;
- determining, by the computer system upon an elapse of the second time window, that no selection of the option was received from the user device; and outputting, by the computer system, the electronic request to a back-end system that manages the delivery of the replacement amount of the item.

11. The computer-implemented method of claim 5, wherein the rule and the constraint are stored in a database remote to the computer system, wherein the profile stores a counter identifying a number of times the customization was used in association with electronic requests for the device, and wherein the constraint limits the customization based at least in part on the number of times.

12. The computer-implemented method of claim 11, further comprising:
- based at least in part on the amount of the item and prior to generating the electronic request, accessing, by the computer system, the rule and the constraint from the database and determining, by the computer system, the number of times from the counter in the profile;
- generating, by the computer system, the electronic request by at least limiting the customization based at least in part on the constraint according to the number of times; and
- outputting, by the computer system, the electronic request to a back-end system that manages a delivery of the replacement amount of the item.

13. The computer-implemented method of claim 11, further comprising:
- outputting, by the computer system, the electronic request to a back-end system that manages a delivery of the replacement amount of the item;
- receiving, by the computer system from the back-end system, an indication that the electronic request was customized based at least in part on the rule and the constraint; and
- updating, by the computer system, the counter in the profile based at least in part on the indication.

14. A non-transitory computer-readable storage medium comprising computer-readable instructions that, upon execution on a computer system, cause the computer system to perform operations comprising:
- receiving a message from an automatic replenishing device (ARD) that is associated with an identifier, the message comprising a header and a payload, the payload comprising the identifier and sensor data that indicates an amount of an item, the payload encrypted with a first encryption key;
- decrypting the payload based at least in part on a second encryption key;
- determining the identifier and the sensor data from the payload;
- storing, based at least in part on an authentication of the message, a timestamp associated with the message and the sensor data in a profile;
- determining the amount of the item based at least in part on a plurality of sensor data and a plurality of timestamps stored in the profile;
- determining, based at least in part on an identifier of the item, a rule that specifies a customization of an electronic request for a replacement amount of the item, the rule applicable to the item or a category of the item independently of the ARD;
- determining, based at least in part on the identifier of the ARD, a constraint that limits an application of the rule to the customization;
- determining, from the profile, a past customization associated with the identifier of the ARD;
- determining a limit on the customization based at least in part on the constraint and the past customization;

generating the electronic request for the replacement amount of the item based at least in part on the amount of the item and the limit on the customization.

15. The non-transitory computer-readable storage medium of claim 14, wherein the operations further comprise:

sending a notification about a delivery of the replacement amount to a user device associated with a user of the ARD, the notification comprising an option to cancel the delivery.

16. The non-transitory computer-readable storage medium of claim 15, wherein the operations further comprise:

updating a user account associated with the user by at least adding information about the electronic request to the user account, wherein the information comprises the identifier of the ARD, wherein the user account stores a first set of past electronic requests identifying the user as originating the first set, and wherein the user account further stores a second set of past electronic requests identifying the ARD as originating the second set.

17. The non-transitory computer-readable storage medium of claim 14, wherein the operations further comprise causing, based at least in part on the electronic request, a delivery of the replacement amount to a location associated with the ARD by at least:

outputting the electronic request to a back-end system that manages the delivery of the replacement amount of the item; and receiving, from the back-end system, an indication that the replacement amount of the item is available from a storage facility associated with the back-end system.

18. The non-transitory computer-readable storage medium of claim 14, wherein the electronic request comprises the identifier associated with the ARD, and wherein the electronic request is customized based at least in part on the identifier from the electronic request.

19. The non-transitory computer-readable storage medium of claim 14, wherein the electronic request comprises information identifying a type of the ARD, and wherein the electronic request is customized based at least in part on the type of the ARD.

20. The non-transitory computer-readable storage medium of claim 14, wherein the profile is associated with the ARD stores information about customizations of past electronic requests associated with the item and the ARD, and wherein the constraint specifies the limit based on the information about the customizations of the past electronic requests.

* * * * *

UNITED STATES PATENT AND TRADEMARK OFFICE
CERTIFICATE OF CORRECTION

PATENT NO. : 11,023,855 B1  
APPLICATION NO. : 15/927324  
DATED : June 1, 2021  
INVENTOR(S) : Allison Kramer et al.

Page 1 of 1

It is certified that error appears in the above-identified patent and that said Letters Patent is hereby corrected as shown below:

On the Title Page

Item (72), inventor, should read:  
Allison Kramer, Seattle, WA (US);  
Kevin Chu, Seattle, WA (US);  
Samuel Stevens Heyworth, Seattle, WA (US);  
Devon Merritt, Seattle, WA (US);  
Amirali Virani, Bellevue WA (US);  
Hannah McClellan Richards, Boise, ID (US)

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*